(12) United States Patent
Kiperberg et al.

(10) Patent No.: US 9,756,048 B2
(45) Date of Patent: Sep. 5, 2017

(54) SYSTEM AND METHODS FOR EXECUTING ENCRYPTED MANAGED PROGRAMS

(71) Applicant: TRULY PROTECT OY, Jyväskylä (FI)

(72) Inventors: Michael Kiperberg, Ashkelon (IL); Amit Resh, Even Yehuda (IL); Nezer Zaidenberg, Hod Hasharon (IL)

(73) Assignee: TRULY PROTECT OY, Jyväskylä (FI)

( * ) Notice: Subject to any disclaimer, the term of this patent is extended or adjusted under 35 U.S.C. 154(b) by 0 days.

(21) Appl. No.: 14/938,015

(22) Filed: Nov. 11, 2015

(65) Prior Publication Data
US 2016/0094555 A1    Mar. 31, 2016

Related U.S. Application Data

(63) Continuation-in-part of application No. 14/088,405, filed on Nov. 24, 2013, now Pat. No. 9,471,511.

(30) Foreign Application Priority Data

Nov. 27, 2014 (FI) ..................................... 20140326

(51) Int. Cl.
*G06F 12/08* (2016.01)
*H04L 29/06* (2006.01)
(Continued)

(52) U.S. Cl.
CPC ...... *H04L 63/0876* (2013.01); *G06F 12/0888* (2013.01); *G06F 12/1408* (2013.01);
(Continued)

(58) Field of Classification Search
CPC ............. G06F 12/0888; G06F 12/1408; G06F 2212/1052; H04L 63/0876; H04L 63/0435; H04L 63/064
See application file for complete search history.

(56) References Cited

U.S. PATENT DOCUMENTS

| 5,751,996 A | 5/1998 | Glew |
| 8,943,278 B2 | 1/2015 | Pohlack |

(Continued)

OTHER PUBLICATIONS

TrulyProtect, "Enter TrulyProtect: An Innovative Crypto-Based Copy Protection System", White Paper, Sep. 2013 [online], [retreived on Apr. 29, 2015], pp. 1-14; http://www.trulyprotect.com/wp-content/uploads/2013/04/TP_white_Paper_v2.pdf.

*Primary Examiner* — Hiep Nguyen
(74) *Attorney, Agent, or Firm* — Yagod Morris & Associates

(57) ABSTRACT

The present disclosure relates to systems and methods for enabling execution of encrypted managed programs in common managed execution environments. In particular the disclosure relates to method of loading and associating an extension module to the managed execution environment configured to receive execution event notifications. The events corresponding to the execution of encrypted methods are intercepted and passed on to a decryption module operable to execute within an hypervisor environment, such that the managed encrypted program is decrypted, executed in a secured location, preventing access of untrusted party. The decryption module is further configured to discard decrypted instruction if cooperation of the extension module is required, or upon program termination.

20 Claims, 13 Drawing Sheets

(51) Int. Cl.
*G06F 12/14* (2006.01)
*G06F 12/0888* (2016.01)

(52) U.S. Cl.
CPC ........ *H04L 63/0435* (2013.01); *H04L 63/064* (2013.01); *G06F 2212/1052* (2013.01)

(56) References Cited

U.S. PATENT DOCUMENTS

| | | | |
|---|---|---|---|
| 2010/0042846 A1* | 2/2010 | Trotter | G06F 21/31 713/182 |
| 2011/0246767 A1 | 10/2011 | Chaturvedi et al. | |
| 2014/0006805 A1* | 1/2014 | Colp | G06F 12/1425 713/193 |
| 2014/0040616 A1 | 2/2014 | Barber | |
| 2014/0337637 A1 | 11/2014 | Kiperberg et al. | |

* cited by examiner

1

SYSTEM AND METHODS FOR EXECUTING ENCRYPTED MANAGED PROGRAMS

CROSS-REFERENCE TO RELATED APPLICATIONS

This application is a Continuation-in-Part of Applicant's co-pending U.S. patent application Ser. No. 14/088,405 filed Nov. 24, 2013, and claims the benefit of priority from Finnish Patent Application No. 20140326 filed Nov. 27, 2014. The contents of the above-referenced applications are incorporated herein by reference in their entirety.

FIELD OF THE INVENTION

The disclosure herein relates to systems and methods of software-based management for executing encrypted managed programs, maintaining secrecy and privacy of the decrypted instructions and associated decryption keys. In particular the disclosure relates to allowing execution of a partially encrypted program written for execution environments.

BACKGROUND OF THE INVENTION

Digital content such as games, videos and the like may be susceptible to unlicensed usage, having significant adverse impact on the profitability and commercial viability of such products. Commonly, such commercial digital content may be protected by a licensing verification program; however these may be circumvented by reverse engineering of the software instructions of the computer program which leaves them vulnerable to misuse.

One way of preventing circumventing of the software licensing program, may use a method of "obfuscation". The term obfuscation refers to making software instructions difficult for humans to understand by deliberately cluttering the code with useless, confusing pieces of additional software syntax or instructions. However, even when changing the software code and making it obfuscated, the content is still readable to the skilled hacker.

Additionally, publishers may protect their digital content product by encryption, using a unique key to convert the software code to an unreadable format, such that only the owner of the unique key may decrypt the software code. Such protection may only be effective when the unique key is kept secured and unreachable to an unwanted party. Hardware based methods for keeping the unique key secured are possible, but may have significant deficiencies, mainly due to an investment required in dedicated hardware on the user side, making it costly, and therefore, impractical. Furthermore, such hardware methods have been successfully attacked by hackers.

Software copy-protection is currently predominantly governed by methodologies based on obfuscation, which are volatile to hacking or user malicious activities. There is therefore a need for a better technique for protecting sensitive software sections, such as licensing code.

Further, software programs operable in managed execution environments have become widespread and more common, in recent years. Unlike native programs, managed programs are not executed directly by the CPU. Rather managed programs may require a native program to interpret the managed program. Managed execution environments may be considered superior to native environments in terms of memory management, debugging and profiling support, making this type of programs advantageous to developers of desktop and mobile applications.

It is particularly noted that even if it may be reasonable to assume that a sequence of native program instructions may not be intercepted, for read or modification, during execution, such an assumption would not be reasonable for a managed execution environment. A managed execution environment may be susceptible to unexpected behaviors introduced into the software implementing the execution environment. There is therefore a need for a technique for executing securely encrypted managed programs on existing managed execution environments.

The invention below addresses the above-described need.

SUMMARY OF THE INVENTION

Embodiments described herein, relate to systems and methods for software-based management of executing a managed program in a managed program execution environment. Specifically, the invention addresses various vulnerabilities associated with executing encrypted managed programs in common managed execution environments, mainly as decrypted instructions and decryption keys may be accessible to an untrusted party or otherwise susceptible to hacking. The techniques described herein allow the execution of partially encrypted managed program, ensuring that the program cannot be reverse engineered, bypassed or circumvented. For example, a license check code for software based products, if present, may be executed effectively without being bypassed or circumvented.

In particular, embodiments described herein allow the encrypted executable instruction sequence to be decrypted, executed and discarded inside the CPU memory, preventing any unauthorized use of the encrypted code.

Managed programs, in contrast to native programs may not be interpreted directly by the CPU, requiring a special execution environment to interpret the program or translate the executable code partially to equivalent native programs. Managed execution environments may allow external software modules to be loaded upon execution. The software modules may be notified of various events that may occur within the managed execution environments.

The execution of a managed program is controlled via an extension module loaded by the managed program environment. The extension module, based upon execution event analysis controls the execution, such that unencrypted instructions are executed within the managed program environment, enabling the execution of the decrypted code within a decryption module. The decryption module resides in a hypervisor environment, thus preventing unauthorized access to the decryption key and to the decrypted instructions.

According to one aspect of the disclosure a method is hereby taught for executing an encrypted code section in the CPU memory cache, where the encrypted code section comprising a plurality of encrypted code instructions, the method comprising: writing the encrypted code section to the CPU memory cache; changing said CPU memory cache from an unshielded state into a shielded state; decrypting the encrypted code section; storing the decrypted code instructions of the encrypted code section into the CPU memory cache; and executing the decrypted code instructions from the designated cache-line in the CPU memory cache.

Additionally, the method of executing an encrypted code section may further comprise deleting the decrypted code from the CPU memory cache following execution of the decrypted code.

Where appropriate, the method of executing an encrypted code section may comprise restoring the CPU memory cache state to the unshielded state following the deleting of the decrypted code.

Additionally and as appropriate, wherein referencing unshielded state, is characterised by at least one of preemption and CPU interrupt handler being enabled.

Additionally and as appropriate, wherein referencing shielded state, is characterised by at least one of preemption and CPU interrupt handler being disabled.

The method for executing buffered encrypted code section in the CPU memory cache, wherein the step of decrypting the encrypted code section further comprises obtaining an encryption key.

Optionally, the encryption key is stored in a CPU register.

Optionally, the encryption key is stored in a a hypervisor environment.

According to another aspect of the disclosuer a method is taught for executing an encrypted code section in a CPU memory cache, the encrypted code section comprising a plurality of encrypted code instructions, the method comprising: writing the encrypted code section to the CPU memory cache; copying the encrypted code into a decryption module, the dycryption module is loaded in a hypervisor environment; decrypting the encrypted code section using a decryption key, the decryption key is stored in the hypervisor environment; storing decrypted code instructions of the encrypted code section in the CPU memory cache; executing the decrypted code instructions from the designated cacheline of the CPU memory cache; and discarding the decrypted code instructions from the said CPU memory cache.

In yet another aspect of the disclosuer another method is taught for using a managed execution system in an improved manner to execute an encrypted managed program, the system comprising a managed execution environment, an extension module and a decryption module, the encrypted managed program comprising a plurality of executable blocks, each executable block comprising at least one instruction sequence, the method comprising: loading the encrypted managed program onto the managed execution environment; obtaining the at least one instruction sequence associated with the encrypted managed program; if the at least instruction sequence is not encrypted then executing the at least one instruction sequence; and if the at least one instruction sequence is encrypted then transferring, by the extension module, the encrypted instruction sequence to a decryption module; and executing, by the decryption module, the encrypted instruction sequence.

Accordingly, the encrypted managed program is configured to overwrite original methods with an equivalent encrypted instruction sequence.

As appropriate, the step of loading the managed encrypted program comprises: invoking the extension module within the managed execution environment.

As appropriate, the step of obtaining the at least one instruction sequence, comprises: analyzing the at least one instruction sequence; and communicating at least one execution event notification associated with the at least one instruction sequence to the extension module;

As appropriate, the step of executing said encrypted instruction sequence, comprises: invoking the decryption module within an hypervisor environment; decrypting, by the decryption module, the encrypted instruction sequence into a decrypted instruction sequence; analyzing the decrypted instruction sequence to determine an execution-locator; if the execution-locator is local, then executing the decrypted instruction sequence; and if the execution-locator is external, then transmitting the decrypted instruction sequence to the extension module.

As appropriate, the step of executing the decrypted instruction sequence comprises: interpreting said decrypted instruction sequence.

As appropriate, the step of decrypting the encrypted instruction sequence comprises: obtaining a decryption key from an authority server; and decrypting the encrypted instruction sequence using the decryption key.

As appropriate, the step of transmitting the decrypted instruction sequence comprises: discarding all the decrypted instructions sequence except a current instruction; executing, by the extension module, the current instruction; and communicating, by the extension module, at least one result associated with the execution of the current instruction to the decryption module.

Optionally, the decryption key is protected by said hypervisor environment.

Additionally, the managed environment system further comprises a context monitor operable to synchronize execution context status between the extension module and the decryption module.

Variously, the at least one execution event notification is selected from a group of: a method entry indication, a specific instruction execution, a method invocation indication, a program loading indication, an occurrence of an exception condition and combinations thereof.

It is noted that in order to implement the methods or systems of the disclosure, various tasks may be performed or completed manually, automatically, or combinations thereof. Moreover, according to selected instrumentation and equipment of particular embodiments of the methods or systems of the disclosure, some tasks may be implemented by hardware, software, firmware or combinations thereof using an operating system. For example, hardware may be implemented as a chip or a circuit such as an ASIC, integrated circuit or the like. As software, selected tasks according to embodiments of the disclosure may be implemented as a plurality of software instructions being executed by a computing device using any suitable operating system.

In various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

BRIEF DESCRIPTION OF THE DRAWINGS

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings.

DETAILED DESCRIPTION

Figure 1A:
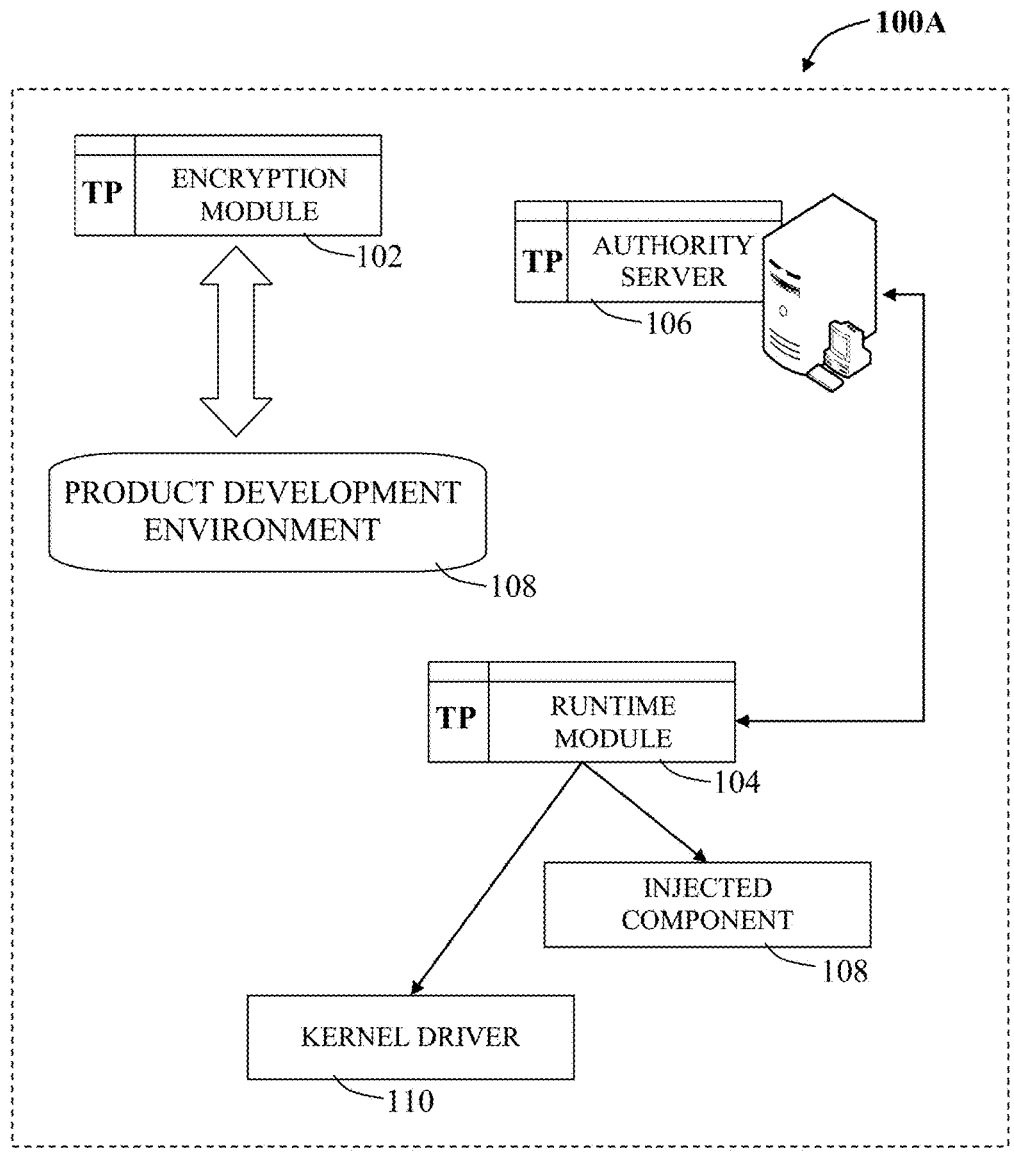
FIG. 1A is a schematic block diagram of the main module components representing the system architecture for software copy-protection used for secure software distribution.

It is noted that the systems and methods of the invention herein may not be limited in their application to the details of construction and the arrangement of the components or methods set forth in the description or illustrated in the drawings and examples. The systems and methods of the invention may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

In various embodiments of the invention, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

One Aspect of the present disclosure relates to systems and methods for executing encrypted managed programs in common managed execution environments such that decrypted instructions and decryption keys may not be susceptible to hacking or accessible to an untrusted party.

Another aspect of the present disclosure relates to techniques for ensuring that a given set of protected data blocks are not accessible from the main memory, by using a system and software-based management of cache pinning triggered by an encrypted section of code.

As used herein, a "managed program" refers to a software program that contains a sequences of instructions organized in blocks, each such block is called a method. In contrast to native programs, a managed program may not be able to be interpreted directly by the CPU and requires a special execution environment. Such execution environment is operable to interpret a managed program or translate the program, partially, to an equivalent native program.

As used herein, an "encrypted managed program" refers to a managed program, in which the instructions of at least some of the methods are encrypted and the original instructions of the methods are either removed or overwritten such that a reconstruction of the original instructions is unfeasible.

Additionally, a managed execution environment may allow an external software module to be loaded when an execution of a managed program is triggered. The software module may be configured to receive notifications of various events that may occur within the managed execution environment.

As used herein a "hypervisor" refers to software operable to be executed by a CPU with privileges superior to privileges granted to the operating system. A hypervisor may be configured to intercept access to essential resources inside the CPU.

As used herein, an "untrusted party", in the context of the current disclosure, refers to any computer program that is not intended by the system architecture described herein to access the decryption key or the decrypted instructions.

As used herein, a "client system" refers to any kind of consumer data unit having a memory region and a region for processing digital information such as a software program, blocks of data, or any other digitally stored information including but not limited to applications such as video, audio, or gaming programs, and including gaming programs played synchronously and non-synchronously among two or more participants.

Managed Environment:

Some embodiments described herein disclose managed program execution systems enabling execution of an encrypted managed program. Such systems may be configured so as to ensure that the program may not be reverse-engineered. Furthermore, the systems may allow critical routines, such as license check code in software based products, if present, to be executed without being bypassed or circumvented. In particular, the invention allows encrypted code to be decrypted, executed and discarded inside the CPU memory, preventing any unapproved use of the encrypted code.

Managed program environments have become widespread and more common, providing functionality considered superior as compared to native environments, especially in terms of memory management. Two known systems of such execution environments are the Java Virtual Machine (JVM) and the Common Language Runtime (CLR) and various other executions environments exist, each having its own benefits. Further, the structure of a managed program is described by the specification of the execution environment for which the program was written. The encrypted instructions, of an encrypted managed program, may be stored in a location different from the method's original location. Furthermore, it is noted that the original instructions of the methods are erased or overwritten, preventing a possible rebuilding of the original instructions. It is further noted that the decryption key may not be stored with the encrypted managed program, as detailed hereinafter.

Managed execution environments allow loading of external software modules upon execution of a managed program. The managed execution environment may be configured to transmit notifications of various execution events to the external modules. For example, execution events may refer to method invocation, program loading, occurrence of exception conditions and the like. The managed execution environment may be configured to communicate with the external module by invoking a function defined in the external module. The associated function may allow interaction with the managed execution environment, to suppress or complement the normal execution of flow a managed program, for example.

It is specifically noted that the hardware architecture of the CPU is required to allow execution of a hypervisor. The hypervisor may be configured to define accessibility rights of memory regions. Particularly, memory regions hosting the decryption key or the decrypted instructions, disables access to code instructions outside the hypervisor. Further, the access rights, granted to the currently executed code are inherited by any code instructions called by it. Thus, the code instructions that is configured to be executed inside the hypervisor may not call any code instructions to be executed outside the hypervisor.

It is also noted that the embodiments described herein offers a unique approach to software copy-protection, providing a system and methods based on encrypting critical software product functionality. Accordingly, the critical software section may be decrypted and the decrypted code stored inside the CPU where it can also be executed and eventually erased.

Execution in Managed Environment:

Embodiments described herein address the problem of executing encrypted managed programs in common managed execution environments such that the decrypted instructions and the decryption key are not susceptible or accessible to an untrusted party.

The technique, as described hereinafter, allows execution of programs, encrypted or partially encrypted, to ensure that a program may not be reversed engineered or bypassed. Furthermore, the present disclosure provides protection for critical code sections such as license check encrypted instructions of software based products, if present, enabling the license check to be executed effectively without being bypassed or circumvented. In particular, the disclosure allows the encrypted instructions to be decrypted, executed and discarded inside the CPU memory, preventing any unapproved use of the encrypted instructions for reverse-engineering, bypassing and the like.

Execution of an encrypted managed program, initially uses the managed execution environment for executing the unencrypted parts of the computer program, communicating execution events to an extension module, as described hereinbelow in relation to FIG. 2A. Upon reaching an encrypted method (a sequence of encrypted instructions organized in blocks), the managed execution environment transfers control to the extension module, which further transfers control to a decryption module, being executed in a hypervisor environment. The decryption module is operable to decrypt the encrypted instructions and is further configured to interpret and execute, accordingly. During execution, an instruction may be encountered requiring the cooperation of the managed execution environment for interpretation. At this point, the decryption module may be configured to discard the decrypted instructions, except of the current instruction, transfering the control back to the extension module. The extension module is then interpreting the current decrypted instruction, transfering control to the decryption module or to the managed execution environment, as appropriate.

Thus, it is particularly noted that having the decryption module operable inside a hypervisor environment prevents unauthorized access to decryption key(s) and decrypted instructions.

Copy-Protection Aspects:

Various other embodiments described herein disclose a software copy-protection system based on modern cryptography to ensure that the license check code for software based products is executed successfully and not bypassed or circumvented. In particular, the disclosure prevents protected data blocks from being evicted from the CPU cache, by identifying the set of conflicting data blocks which may share a memory cache line with the protected data blocks, thereafter making the regions of memory containing conflicting data blocks non-cacheable.

Software copy-protection is currently predominantly governed by methodologies based on obfuscation, which are vulnerable to hacking Hackers have demonstrated they can break these methodologies within several weeks from release. The current disclosure offers a different approach to software copy-protection, providing a system and methods based on encrypting critical software product functionality. Accordingly, the critical software section may be decrypted to store the decrypted data-blocks in memory cache, while making the conflicting data-blocks un-cacheable, and thus avoiding cache eviction of the protected data-blocks.

Caching Functionality:

A central processing unit (CPU) is designed with a memory hierarchy organized into several levels, each of which is smaller but faster than the level below. The cache is the memory level between CPU and main memory and may be used by the CPU of a computer to reduce the average time of accessing memory, increasing the data execution speed. The cache is divided into lines, which is the unit data transfer between the memory and the cache. Once a line reaches the cache, any access to the data elements in the line is a cache hit, and if a data element is not found, a cache miss occurs. As the cache size is smaller than main memory, when new data is brought in, some of the data stored in the cache may need to be replaced.

Typically, the memory cache sub-system in modern CPUs consists of at least three levels, specified as L1, L2 and L3. The CPU further maintains an inclusion consistency between memory cache levels such that L3 contains all the data content of L2 and L2 contains all the data content of L1. Therefore, L3 is the largest level but slower compared to L1 and L2. The L1 can be accessed very quickly by the CPU, so it's a good place to keep the code and data that the CPU is most likely to request It is noted that the L1 may be accessed very quickly by the CPU, so the code and data that the CPU is most likely to request may be kept there. When the CPU needs data, it may check the smaller cache L1 first. If the L1 misses (cache miss) then the CPU may further check L2. If another miss occurs, then L3 is being checked before finally looking in system's main memory.

The CPU is operable to fill the memory cache with data content of main memory when the data is accessed, but only if the data content resides in a cacheable memory region. If the data content is already cached, then the CPU may use the data content directly from memory cache without accessing main memory. Accordingly, for determining whether some data content exists in memory cache, every block of data stored in memory cache is tagged by its address.

Where appropriate, there may be personalized license schemes associated with a software package, such as gaming software, media software, functional software applications or the like. The license scheme may further be tied to user credentials, and may be referred to as a license check. Additionally, the target computer system may contain a location where keys may be hidden. Such locations commonly exist in modern desktop CPU as well as many modern devices using technologies like near field communication (NFC) or trusted platform modules (TPM) modules.

It is noted that the target computer system may be validated to be a real machine, not a virtual machine (VM) such as emulators, simulators, or having any hypervisors installed. Thus the stored decryption keys may remain hidden, in a CPU register, for example. The architecture of the systems and methods described herein may provide the necessary tools for such validity check.

System's Architecture:

It is noted that the system software architecture provides the development and runtime environments for executing checks of the protected data-blocks successfully, avoiding bypassing or circumventing by any unwanted party.

The distributed system's architecture, as described hereinafter with reference to FIG. 1A, comprises of three main module components: an encryption module component 102, a runtime module component 104 and an authority server component 106. The encryption module 102 may allow for integration with the customer's development environment to produce encrypted source code instead of standard executable machine code. The runtime module 104 is structured in two parts, where the first sub-component 108 may be injected into the product encrypted executable and the second sub-component 110 may act as the kernel driver on the target computer system, operable in kernel mode (privilege ring 0). The authority server 106 is configured to provide the necessary decryption key for the software to operate correctly.

Optionally, encrypting the whole source code is possible, but generally does not contribute effectively and may further, incur a degree of performance degradation. In practice, encrypting only a set of critical executable functions to allow for the license check and software to function properly, may be sufficient.

Optionally again, a two layered encryption may be used in which a section of protected code, say a section including the critical functions, may be encrypted with a first key to produce a first level encrypted executable file. Furthermore, the first level encrypted executable file may be further encrypted by a second key to produce a second level encrypted executable file. It is noted that even if the second key is obtained, or the first level encrypted executable file is obtained by some means, the encrypted section of protected data will still require the first decryption key in order to execute the code. According to embodiments of the current disclosure, this section of protected code may only be stored in its decrypted state within the cache of the CPU.

Additionally, when encrypting a product source code, the encryption module component may inject elements of the runtime code and data-structures into the created executable. Accordingly, the resulting executable may be operable to load, run and automatically kick-start the runtime module component and execute successfully, if the correct decryption key is available from the authority server. Since the encryption may use modern cryptography, such as using Advanced Encryption Standard (AES) or the like, reverse engineering of the critical encrypted functions may not be possible, as the industry considers AES or the like to be practically unbreakable.

As appropriate, once associated software is executed, the runtime module component established secured communication channel with the authority server to obtain the associated decryption key for software operability, as described hereinafter in FIGS. 1 and 2. Accordingly, for providing the necessary decryption key, the authority server may validate the request is arriving from a "real" target computer system and not from a virtual machine. As appropriate, any requests from a virtual machine, emulator, simulator or any possibly running hypervisor, may be rejected.

Where appropriate, the authority server may further validate that the target computer system is equipped with operating system (OS) running a known OS kernel.

Additionally or alternatively, the authority server may validate that the target computer is clean of potentially malicious drivers.

Additionally or alternatively, the authority server may validate that the target computer system is representing an authorized/licensed user, namely, a paying customer.

It may be noted that the kernel driver must be initially installed on a target computer system, using conventional driver installation methods.

It may further be noted that the kernel driver may be freely distributed, in various forms such as part of a protected software installation process or the like.

Systems and methods of the disclosure are not limited to the details of construction and the arrangement of the components or methods set forth in the description or illustrated in the drawings and examples. The systems and methods of the disclosure may be capable of other embodiments or of being practiced or carried out in various ways.

Alternative methods and materials similar or equivalent to those described hereinafter may be used in the practice or testing of embodiments of the disclosure. Nevertheless, particular methods and materials are described herein for illustrative purposes only. The materials, methods, and examples are not intended to be necessarily limiting.

System's Embodiments

Reference is made to the system block diagram of FIG. 1A showing schematic distributed system architecture representation 100A of the main module components.

The distributed system's architecture 100A may provide the platform for various secured software functionalities such as software integration, encrypted packaging, software triggering and flow management, providing secured communication channel to allow run-time authentication, obtaining/storing/hiding of decryption keys, validation and product integrity checking and the like.

The distributed system's architecture 100A includes an encryption module component item 102 operable to integrate with the product development environment, a runtime module component item 104 and an authority server component item 106, configured to manage secured communication channel with a client computer system providing decryption key, to allow secured functioning and operability of the encrypted code sections. The runtime module component item 104 further includes two sub-components: an injected code sub-component item 108 and a kernel driver sub-component item 110.

Figure 1B:
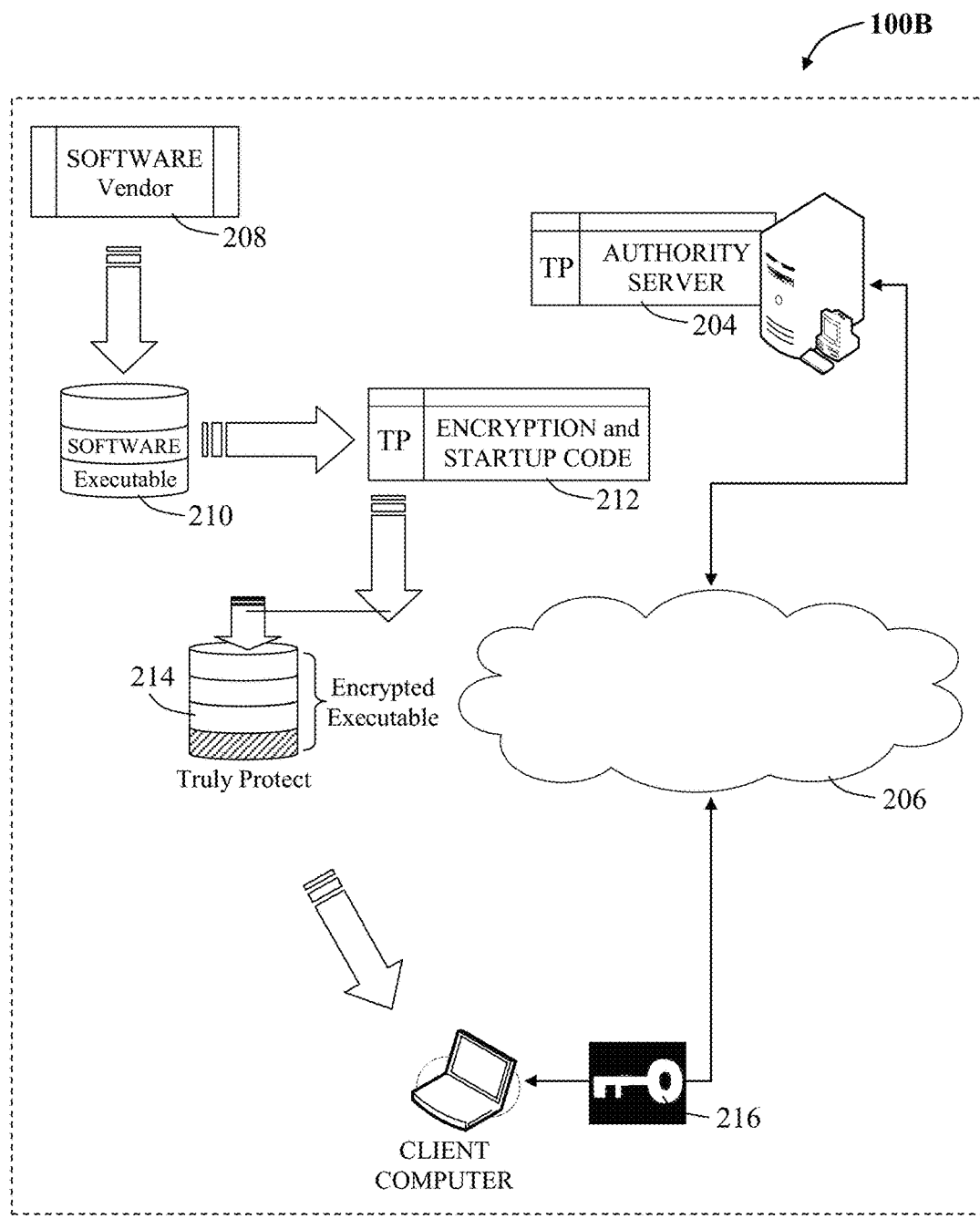
FIG. 1B is a schematic block diagram of the main components of a distributed computing system supporting software copy-protection used for secure software distribution.

The encryption module item 102 may inject the runtime sub-component item 108 including runtime code elements and data-structures into the software executable item 212 (as described in FIG. 1B). The resulting encrypted software executable item 214 (as described in FIG. 1B) may be operable to load, run and automatically kick-start the runtime module. The second sub-component item 108 of the runtime module may be operable as a kernel driver, functioning in the kernel space and may be operable to establish a secured communication channel with the authority server, to manage handling of the decryption keys, for example.

Optionally, the decryption key may be obtained upon every request to decrypt an encrypted code segment.

Additionally or alternatively, the decryption key may be obtained and stored in a CPU register for further usage. Accordingly, upon the next request for the decryption key, may verify the availability of the key in the CPU register and only if not present, a further request may be issued to the authority server item 106. Optionally, the number of uses of a stored decryption key may be limited such that the decryption key is deleted from the registry when the number of usages exceeds a maximum threshold number. Once the maximum threshold is reached, the decryption key may be automatically deleted and upon the next request a new decryption key may be obtained from the authority server, possibly following a verification procedure.

Additionally or alternatively, the decryption key may be obtained and stored in a hypervisor environment for further usage.

Reference is now made to the system block diagram of FIG. 1B, showing schematic representation of the main components of a distributed computing system 100B, based on disclosure's module components, supporting software copy-protection used for secure software distribution. According to various embodiments, such a software distribution system may for example be used for distributing media such as gaming software, audio software, video software, application software and the like.

The distributed computing system 100B may be used to facilitate the authentication of a client computer system to provide protected license checking while supporting functionality of hiding the decryption keys and secured operability of a third party software products' vendor.

The distributed computing system 100B includes a client computer item 202, in communication with an authority server item 204 through communication network item 206. The software vendor item 208 produces a software product comprising a set of executable computer instructions item 210 coupled with injected encrypted startup code item 212 to form an encrypted executable product item 214.

It is noted that the client computer item 202 may retrieve a decryption key item 216 from the authority server item 204, to allow decryption of encrypted instructions.

The distributed computing system 100B may provide an integrated environment for a third party software product vendor to allow encapsulating a software product with encrypted functionality to avoid hacking and miss-use of the software product. The distributed computing system 100B may provide various functionalities such as software integration, encrypted packaging and run-time protection.

The software product vendor item 208 may integrate its development environment with the encryption and runtime modules to allow the product source code to produce encrypted instead of standard executable machine code. Additionally, the encryption module may be used to inject into its vendor's product executable item 210 the required runtime code and data-structures such as start-up code and the like item 212 to provide an encapsulated encrypted product item 214 operable to run on a client computer system item 202 with the desired protected functionality of the vendor's product.

Accordingly, when the vendor's product item 214 is activated on the client computer, the injected code interacts internally with the pre-installed kernel driver, in a kernel-mode context and communicating with the remote authority server to obtain the necessary decryption key, allowing for proper functionality of the vendor's software product.

It is noted that the system may be used for protection of gaming software such as war games, sports, gambling and various other games. Included are games played by a single person, games played synchronously by multiple players, and games played non-synchronously by multiple players. In this context, "played synchronously" means either that multiple players are acting at the same time, or players respond to each other essentially in real-time.

It is further noted that the distributed computing system 100B may support various software and gaming products operable on various computer operating systems (OS), and may further include support for communication devices such as mobile communication devices, handheld devices, tablet computers and the like.

Accordingly, the distributed computing system 100B may be operable to share various software applications. Such software applications may include, for example, gaming, use of graphics, picture, video, text, music files supporting various file formats, multimedia files, combinations thereof or any other data type files, including data collection files and the like.

Figure 2A:
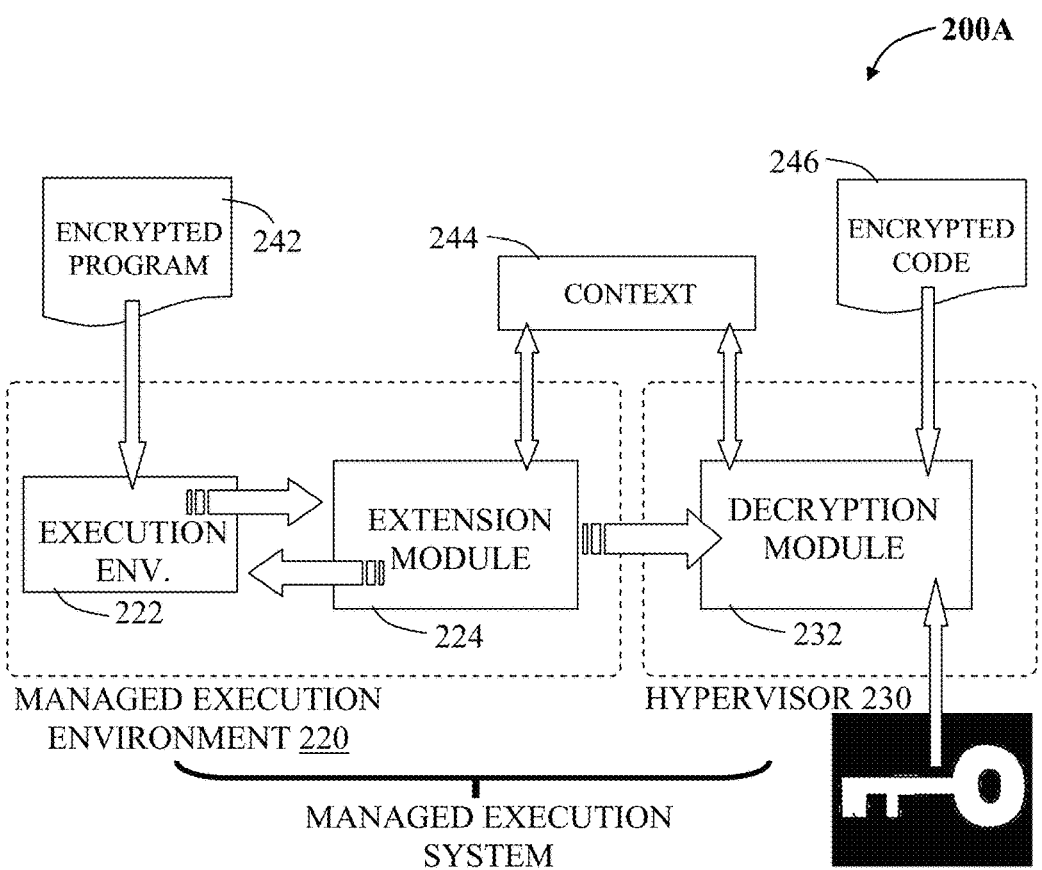
FIG. 2A is a schematic block diagram of the main components representing system architecture for execution of encrypted managed programs.

Reference is now made to the system block diagram of FIG. 2A, showing a schematic representation of the main components of a managed execution system 200A. The system 200A is operable to allow execution of encrypted/partially encrypted managed programs, based upon the module architecture as described hereinafter.

It is noted that critical sections may be used, for example, to facilitate the authentication of a client computer system, provide protected license checking while supporting functionality or hiding the decryption keys and secured operability of a third party software products' vendor. Such operations may be used, variously in software based products, and is commonly encrypted in products such as gaming software, audio software, video software, application software and the like.

The managed execution system 200A, as described herein, with reference to FIG. 2A, comprises a managed execution environment item 220 and a decryption module item 232. The managed execution environment item 220, comprises an execution component item 222 and an extension module item 224. The execution component is operable to execute program instructions of a managed encrypted program item 242 and further configured to load the extension module item 224, which is configured to control the execution flow by receiving or transmitting execution event notifications.

As stated above, the execution environment item 222 is operable to load the extension module item 224 upon execution of a managed program. Accordingly, the extension module item 224 may call functions of the managed execution environment item 220, the extension module item 224 may further alter and update the execution state of the currently executing managed program item 242, and may still further communicate with the decryption module item 232, by calling associated decryption module item 232 functions.

It is particularly noted that the decryption module item 232 may be the only system component configured to be executed within the hypervisor environment item 230.

Further, where appropriate, the decryption key item 248 may only be accessible via the hypervisor environment item 230 and by the decryption module item 232 executing an encrypted code (method) item 246 within the hypervisor environment item 230. The encrypted program item 242 is a regular managed program in which instructions of some methods were erased or overridden in a way that prevents reconstruction of the original instructions. The erased functions are encrypted and stored in the encrypted form item 103 that is used by the decryption module (though accessible to all components). Note that although the encrypted program is presented as separate from the encrypted code purely for ease of comprehension; in practice these components may be stored together or these components may reside in any other memory layout as appropriate. The extension module item 224 and the decryption module item 232 both act as interpreters of the decrypted code. The decryption module item 232 interprets all the instructions that do not require cooperation with the managed execution environment item 220. The extension module item 224 complements the decryption module item 232 and interprets all the instructions that do require cooperation with the managed execution environment. The information about the execution state stored in the context item 244 of the method that is currently being executed in the decryption module item 232 is shared between the extension module item 224 and the decryption module item 232.

Figure 2B:
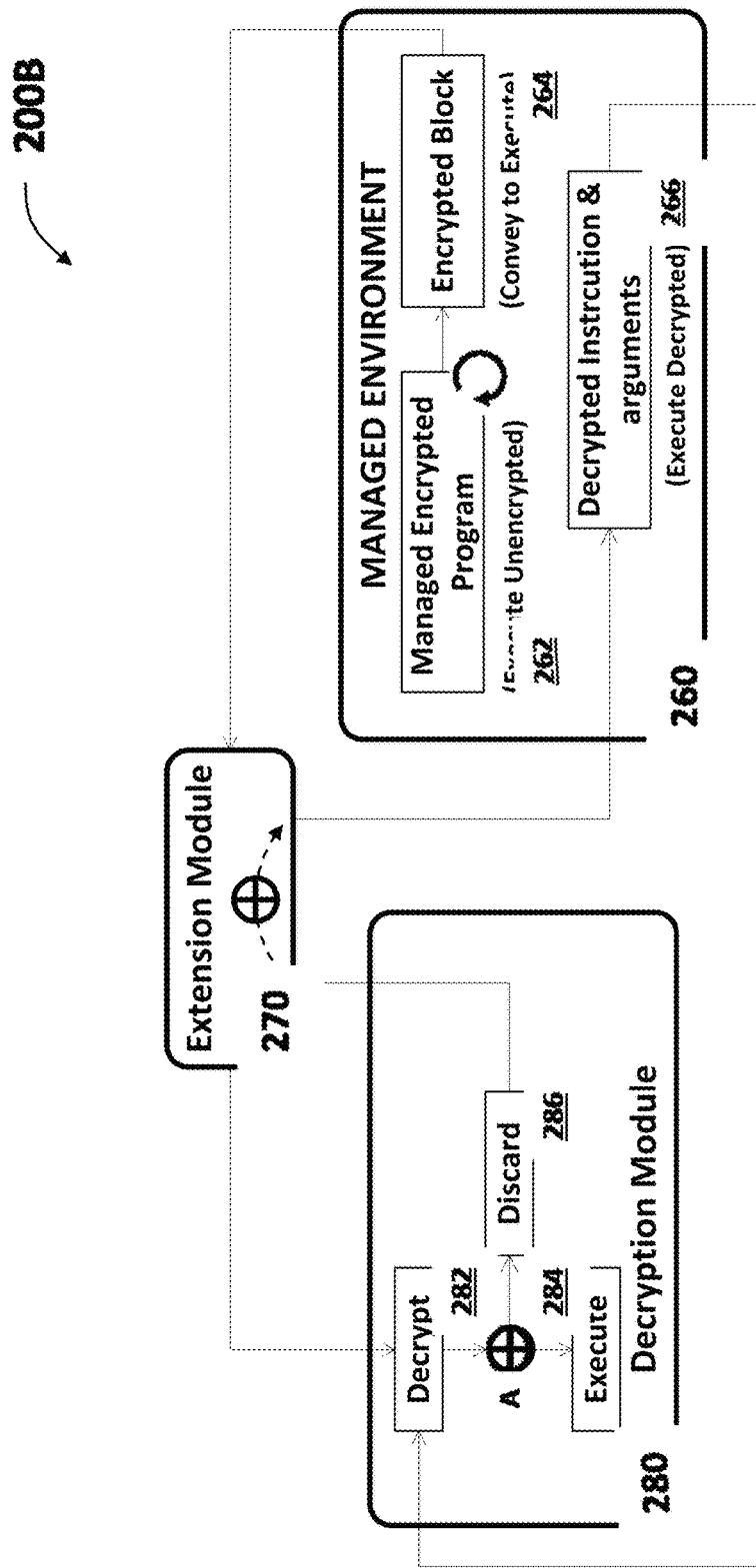
FIG. 2B is a flowchart representing the execution flow of an encrypted managed program in a managed execution environment.

Reference is now made to the flowchart of FIG. 2B of the execution flow 200B representing selected actions in the various system modules (system 200A of FIG. 2A), while executing an encrypted managed program. The managed execution environment item 260 is operable to load and execute the unencrypted part of the encrypted managed program (242, FIG. 2A), and further communicating execution events to the extension module item 270. The decryption module item 280 is operable to decrypt and execute the encrypted instruction sequence of the managed program.

The execution flow 200B includes the steps of: executing, by the managed environment, the unencrypted instruction sequence of the pre-loaded managed execution program—step 262; if the instruction sequence is encrypted, then transmitting the encrypted instruction sequence to the decryption module for execution, via the extension module—step 264; decrypting, by the decryption module, the encrypted instruction sequence—step 282; executing, by the decryption module, the decrypted instruction sequence—step 284; if the instruction sequence requires cooperation externally, then discarding the decrypted instruction sequence, but the current instruction—step 286; and executing, by the managed environment, the current decrypted instruction—step 266. Alternatively and according to the program execution sequence, executing, by the extension module, the current decrypted instruction of step 266.

It is noted that the decision point "A" represent a result of an analysis of the decrypted instruction sequence to determine an execution-locator. If the execution-locator result is local, then the execution of the decrypted instruction sequence is performed locally by the decryption module. If result indicates that the execution-locator is external, then the decrypted code is discarded and the current instruction is transmitted to the extension module.

Figure 3A:
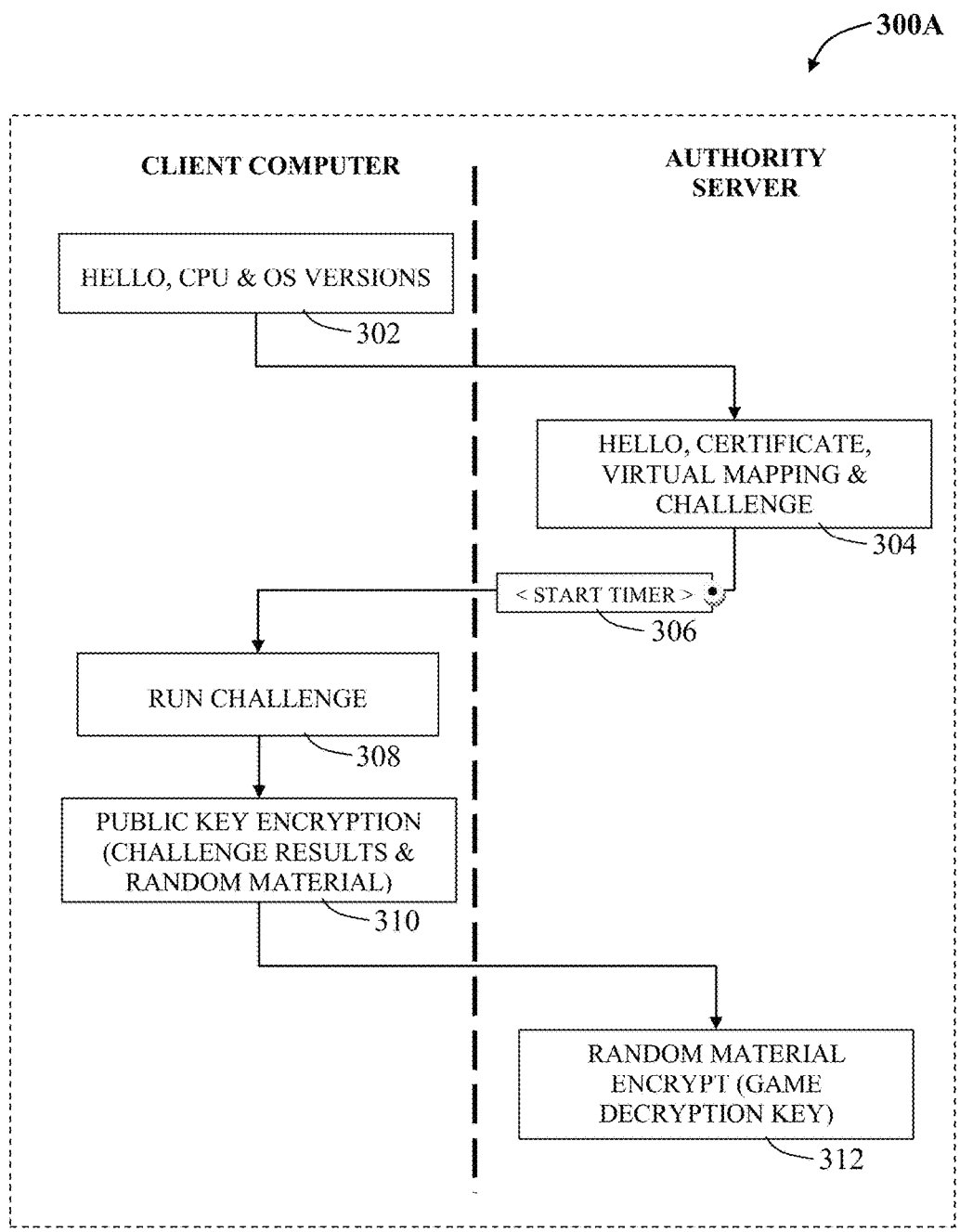
FIG. 3A is a flowchart representing selected actions of a method for performing key exchange communication between a client system computer and an authority server.

Reference is now made to the flowchart of FIG. 3A representing selected actions of a method for performing key exchange communication between a client computer system and an authority server in a distributed computer system 300A.

Executing a protected software function requires a decryption key for the software on the client computer system side for decrypting the encrypted section, making the protected software operable. Such decryption key may be obtained from the authority server. Thus, when the software code is executed, the runtime module residing on the client computer system may be triggered to establish a secured communication channel with the authority server, over Public Key Infrastructure (PKI). The authority server may provide the requested decryption key, based upon a successful validation process. The validation process may comprise checking various parameters applicable to the target client computer, such as: target client computer is a "real machine", not a virtual machine, emulation or the like; target client computer is running a known OS kernel; target client computer is clean of potentially malicious drivers; the user is an authorized/licensed customer and a combination thereto.

The secured communication channel over PKI between the client computer system and the authority server guarantees the privacy of the information exchanged between the two entities. The client computer system may communicate ID information of the client target computer, identifying the owner, providing additional target computer environment parameters and kernel OS version currently running. The authority server may respond by sending a challenge function to be executed by the kernel-mode driver portion of the client target computer. The challenge function may involve check-summing critical portions of the client target computer's memory, and may further monitor several hardware side-effects.

Where appropriate, the challenge response may be configured to timeout by the authority server, such that a correct result within a predetermined period constitutes proof of the validation process, namely being a real machine running a known OS kernel. It may further verify that the correct version of the runtime module is executing on the client target computer. The challenge code may be generated by the authority server and may contain a pseudo-random component, making every challenge different, avoiding any replay-attacks. The runtime module, as a trusted computer, may further verify that client target computer is clean of potentially malicious drivers, by scanning the target machine.

The method for performing key exchange communication between a client computer system and an authority server in a distributed computer system 300A may include sending an initiation message of introduction by the client computer system containing CPU and operating system (OS) parameters for identification—step 302; The authority server may respond to client's introduction with a message containing its certificate, virtual mapping parameters and a challenge function—step 304; which may be run on the client computer system—step 308 after a timer is activated—step 306; the public key encryption may be encapsulated with the results of the challenge function with additional material transmitted to the authority server side—step 310; and the encrypted random material received on the authority server side, and decrypted—step 312 as part of the identification process.

It is noted that the client computer system may check the authority server certificate's validity period, for example. If the current date and time are outside of a range, the licensing process may not go any further.

Figure 3B:
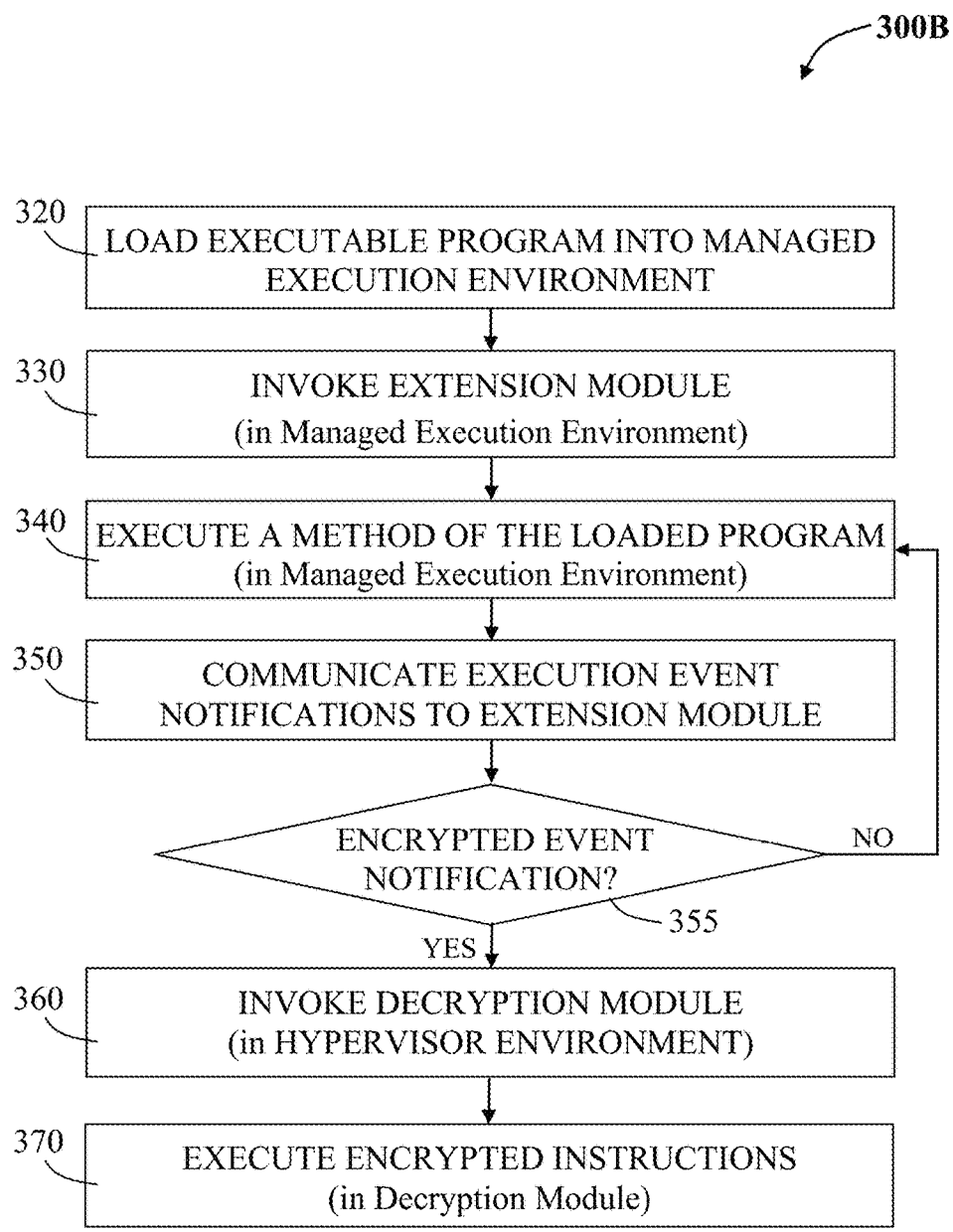
FIG. 3B is a flowchart representing selected actions of a method of an encrypted managed program execution in a managed execution environment.

Reference is now made to FIG. 3B, representing selected actions of a method 300B for executing an encrypted managed program in a managed execution system, such as described herein above in FIG. 2A. The encrypted managed program (item 242, FIG. 2A) is operable to execute by the managed execution environment (item 220, FIG. 2A) and controlled by the extension module (item 224, FIG. 2A). The managed execution environment is configured to execute the non-encrypted program instructions, while the the decryption module (item 232, FIG. 2A) is operable to control and execute the encrypted instructions inside the hypervisor environment (item 230, FIG. 2A). Additionally, the extension module is configured to execute decrypted instructions requiring cooperation of the managed execution environment.

The method 300B includes the steps of: loading an encrypted executable program into the managed execution environment (item 220, FIG. 2A)—step 320 by the execution environment (item 222, FIG. 2A); invoking the extension module (item 224, FIG. 2A) in the managed execution environment (item 220, FIG. 2A)—step 330, by the execution environment (item 222, FIG. 2A); and executing an executable block containing at least one sequence of instructions—step 340, where the managed execution environment is configured to execute the unencrypted instructions, first; Accordingly, and as the execution environment (item 222, FIG. 2A) may be configured, communicating execution event notifications, issued by the execution environment to the extension module of subsequent execution events—step 350.

The extension module may further perform analysis for each such event, deciding if the associated event represents an execution of an encrypted method (an executable block of instructions' sequence)—step 355, or a non-encrypted sequence; if the executed sequence is not encrypted, then, repeating step 340 and the execution control is returned to the managed execution environment. Otherwise, for an encrypted sequence, invoking the decryption module (item 232, FIG. 2A) loaded onto the hypervisor environment (item 230, FIG. 2A); executing the encrypted instruction sequence—step 370, to provide secured execution of the encrypted sequence.

It is noted that the hypervisor is operable to intercept and prevent unauthorized access to the various resources inside the CPU, as the hypervisor is granted with higher privileges than the operating system.

It is further noted that the with current disclosure, the extension module is configured to control the execution of the non-encrypted instruction sequences in the managed execution environment and the decrypted module is configured to control the execution of the encrypted instruction sequences in the hypervisor environment.

Figure 3C:
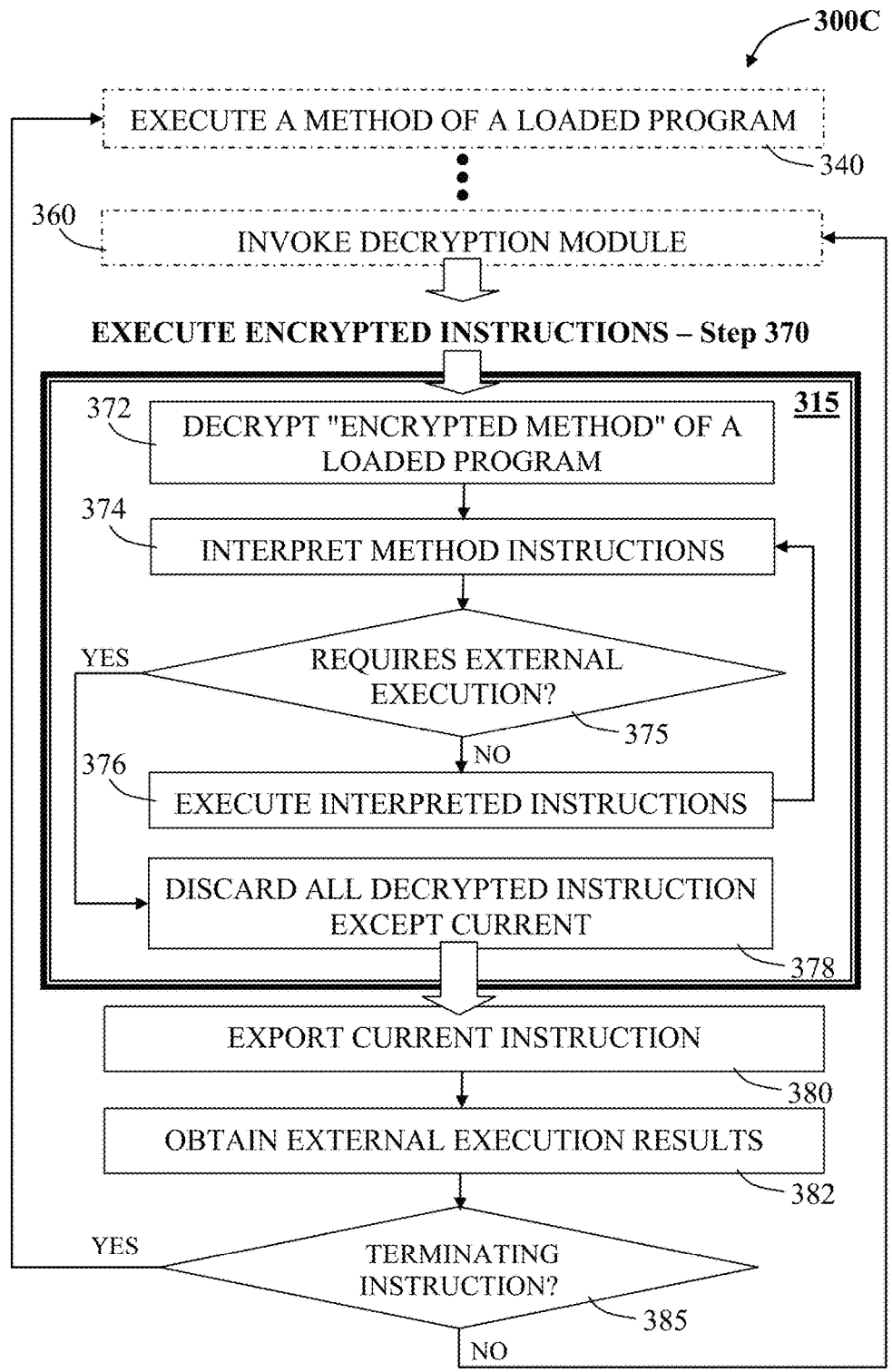
FIG. 3C is a flowchart representing selected actions of a method of an encrypted method execution in a decrypted module residing in a hypervisor environment.

Reference is now made to FIG. 3C, representing selected actions of a method 300C for executing an encrypted instructions sequence (a method) in managed execution system as described in FIG. 2A.

It is noted that method 300C details the flow of executing encrypted instructions (step 370, FIG. 3B) within the decryption module being loaded in the hypervisor environment item 315. It is further noted that the method is essentially performed by the decryption module, with exit points to further the execution of decrypted instructions, if cooperation of the managed environment is required.

The method 300C, executing step 370 (of FIG. 3B) in the decryption module, includes the steps of: decrypting the encrypted instruction sequence using the decryption key (item 248, FIG. 2A) of which, the decryption module is having exclusive access—step 372; analyzing the decrypted instruction sequence—step 374; examining if execution requires cooperation externally, with the managed execution environment—step 375; if execution is to continue by the decryption module, then, interpreting the instructions sequence repeatedly—step 376, until encountering an instruction that may not be interpreted without cooperation with the managed execution environment; if execution requires cooperation externally, with the manage execution environment (item 220, FIG. 2A), then, discarding all decrypted instructions except the current instruction—step 378; exporting the current executable instruction and related arguments to the extension module—step 380, including transfer of control; and upon execution of the current instruction in the managed execution environment, then obtaining the execution result—step 382 by the extension module; analyzing the interpreted instruction executed externally in the managed execution environment—step 385, and if this instruction is a terminating instruction (for example, by returning normally or abnormally or by invoking another method), the managed execution environment resumes control over the encrypted method, returning to step 340 (FIG. 3B) to continue execution of the managed encrypted program; otherwise, returning to step 340 (FIG. 3B), invoking the decryption module to continue execution.

It is noted that wherein referencing interpretation, may refer to direct interpretation by emulating instructions semantics one-by-one, or a binary translation in which a sequence of instructions are converted to a sequence of machine instructions that may be executed directly by the CPU. Additionally or alternatively, interpretation may refer to any other method of execution of the decrypted instructions.

For a better understanding and purely by a way of example, the techniques described hereinabove may use various execution events. The method entry event may occur each time a method is invoked by another method or when the first method is invoked by the managed execution environment. The event may occur prior to the first instruction of the method is executed, but after the arguments of the method are evaluated. While this event may clearly be used for the described technique, the performance toll of this approach may be undesirable since the event may occur on invocation of all, even non-encrypted methods. Thus, alternatively, the current invention presents another approach in which the instructions of the encrypted method are overwritten by a special instruction whose execution generates an execution event. Any instruction that generates an execution event notification is suitable for this approach. The breakpoint is an example of such instruction.

Figure 4A:
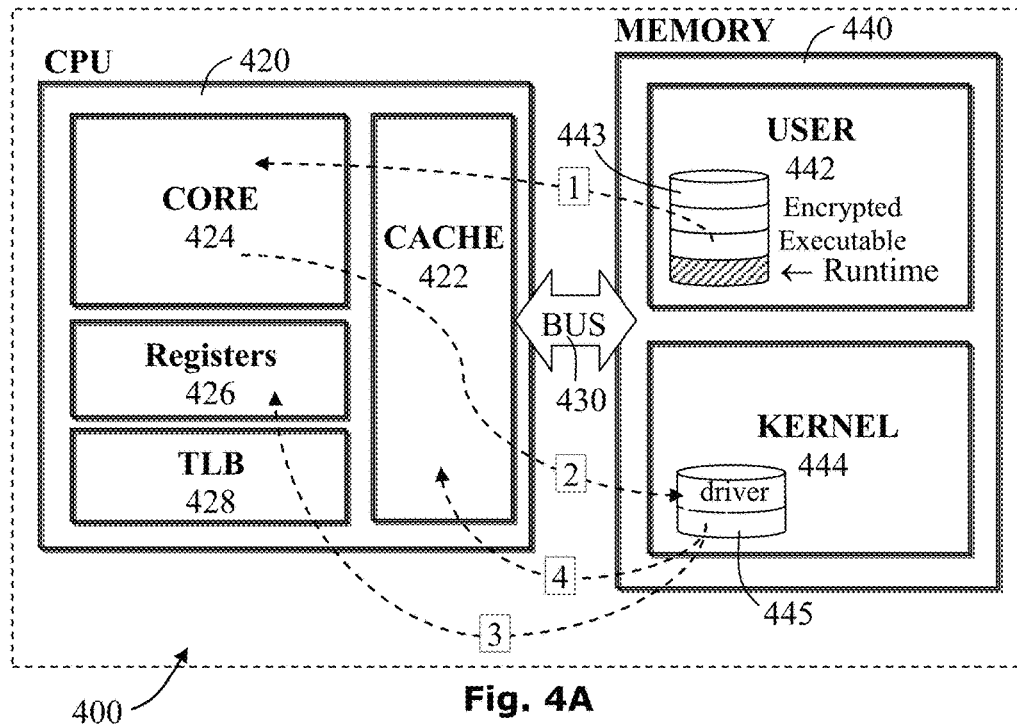
FIG. 4A is a schematic block diagram representing the main components of a client system CPU configured with a kernel driver combined showing a possible execution flow of protected code instructions.

Reference is now made to the schematic block diagram of FIG. 4A, representing the main components of a client system's CPU 400 configured with kernel driver, operable to execute encrypted data-blocks combined with superimposed execution flow steps.

It is noted that the superimposed directional arrowed lines, indicating the encrypted code execution flow, marked 1 through 4 is further expanded and described hereinafter in FIG. 4B, in a form of a flowchart.

The processor architecture may allow the CPU to operate in two modes: kernel mode and user mode and where appropriate, the hardware instruction allows switching from one mode to the other. Accordingly, when the CPU is running in user mode, the CPU may access memory in user space only, and any CPU attempts to access memory in kernel space, results in a "hardware exception". The kernel space is strictly reserved for running the kernel, kernel extensions, and most device drivers. Thus, installing the kernel driver in the kernel space provides the kernel driver with higher priority in managing the protected data-blocks and may have full access to all memory and machine hardware.

The client CPU system 400 includes main components of a CPU item 420 and a main memory item 440 connectable through a system bus item 430. The CPU item 420 may further include a Cache component item 422, a CPU Core component item 424, CPU set of registers item 426 and CPU TLB (Translation Look-aside Buffer) item 428. The main memory item 440 may further include the user space item 442 and the kernel space item 444, which may optionally be independent and implemented in separate address spaces. The user space item 442 may contain the encrypted executable code including the runtime module section item 443, while the kernel space item 444 may be hosting the installation of the kernel driver item 445.

The CPU Core component item 424 may be configured as the processing unit which reads in instructions to perform specific actions, while CPU TLB item 428 is used to map virtual addresses to physical addresses, commonly in a form of a table in the processor memory, enabling faster computing by allowing the address processing to take place independently from the normal address-translation pipeline.

The execution flow may start with the loading of the next encrypted segment 443 to be executed from the user space item 442 to the CPU Core item 424—step 1; the CPU further delegates the encrypted segment to the kernel driver item 445 in the kernel space item 444—step 2; the kernel driver then, shuts down pre-emption and all interrupts, while interacting with CPU registers item 426—step 3; retrieves the decryption key from the registry; and with the retrieved decryption key, optionally may be retrieved from the authority server (not shown) if not already stored in one of the CPU registers 426, decrypts the encrypted segment, placing it into the CPU Cache item 422—step 4; allowing the instructions of the decrypted segment to run in the kernel driver context.

Subsequently, the CPU Cache item 422 is discarded and the kernel may restore pre-emption and interrupts.

Figure 4B:
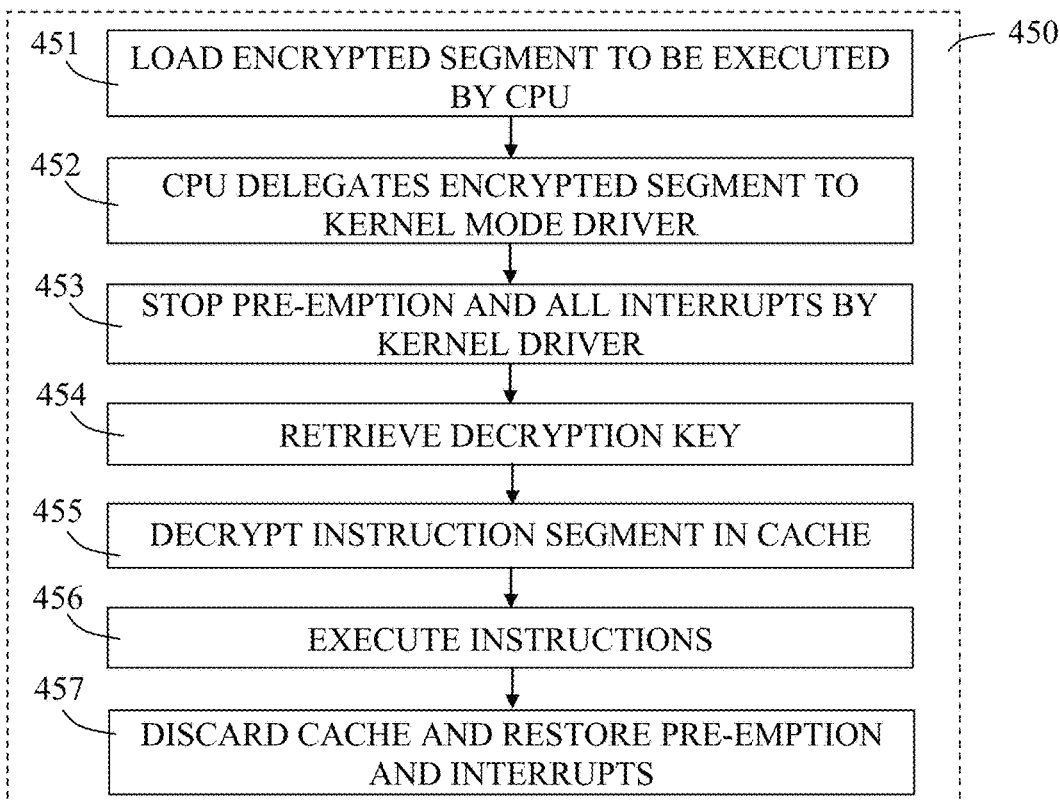
FIG. 4B is a flowchart representing selected actions of a method for executing encrypted code instructions in a processor's CPU.

Reference is now made to the flowchart of FIG. 4B, representing selected actions of a method 450 for executing encrypted code instructions in the client system's CPU.

It is noted that the method 450 may be operable on a client system's CPU 400 configured with kernel driver as described hereinabove in FIG. 4A. The method may be used to change the state of section instructions from an un-executable or encrypted state to an executable or unencrypted state.

The encrypted instruction code segment may be executed on the target computer by runtime module upon completion of the decryption process. As appropriate, after the authority server positively validates the target computer, as described hereinabove, the authority server may transfer the appropriate decryption key over a PKI-secure communication channel. The distributed computer system may be configured to store the decryption key in privileged (protected) registers and may also be configured to monitor and prevent accessing these registers for the duration of the software execution. The distributed computer system then disconnects the communication link to the authority server and execution of the protected software may commence.

When the CPU reaches an encrypted section in an un-executable state but that it needs to execute, the runtime module is invoked, using the obtained decryption key to perform the decryption of the machine instructions and to render the instructions executable.

It is particularly noted that the instructions in the CPU cache, while in an executable state, the unencrypted instructions are not stored to memory. The CPU may execute the decrypted instruction directly from cache, under the context of the kernel-mode driver, under no-preemption and all-interrupts-disabled mode. It may subsequently discard the cache contents just before normal control is returned to the system software.

The decryption key and decrypted machine-code segments may be locked in the CPU and may never be placed on the CPU BUS or stored to external memory. Therefore, malicious users may only have access to the code whose critical segments are encrypted. This property of the current disclosure may prevent the making of copies for unauthorized distribution or bypassing critical code sections such as license check.

Referring to FIG. 4B, the method for executing encrypted code instructions in the client system CPU 450 may include the steps of: loading the encrypted code segment into the CPU Core (item 424, FIG. 4A) from the user space (item 442, FIG. 4A) to be executed by the CPU—step 451; the CPU may then delegate the encrypted code segment to the kernel driver (item 445, FIG. 4A), residing in the kernel space (item 444, FIG. 4A)—step 452; at this stage, the kernel driver may perform two subsequent steps: the first one is shutting down pre-emption and all interrupts—step 453 and retrieving the decryption key(s) from the authority server (not shown)—step 454; using the decryption key to decrypt the encrypted code instructions, placing the decrypted instruction segment into the memory cache (item 422, FIG. 4A)—step 455; executing the decrypted instruction segment under the kernel driver context—456; and upon completion of code segment execution, discarding the memory cache and restoring pre-emption and interrupts—step 457.

Optionally, the decryption key may be obtained from the authority server (item 206, FIG. 2) and thereafter stored in a CPU register (item 426, FIG. 4A) for further usage. The next request for a decryption key, may verify the availability of the decryption key in the CPU register (item 426, FIG. 4A) and only if not available, a further request may be issued to the authority server.

Optionally again, the decryption key may be obtained from the authority server (item 206, FIG. 2) upon every request for decrypting an encrypted code segment.

Figure 5A:
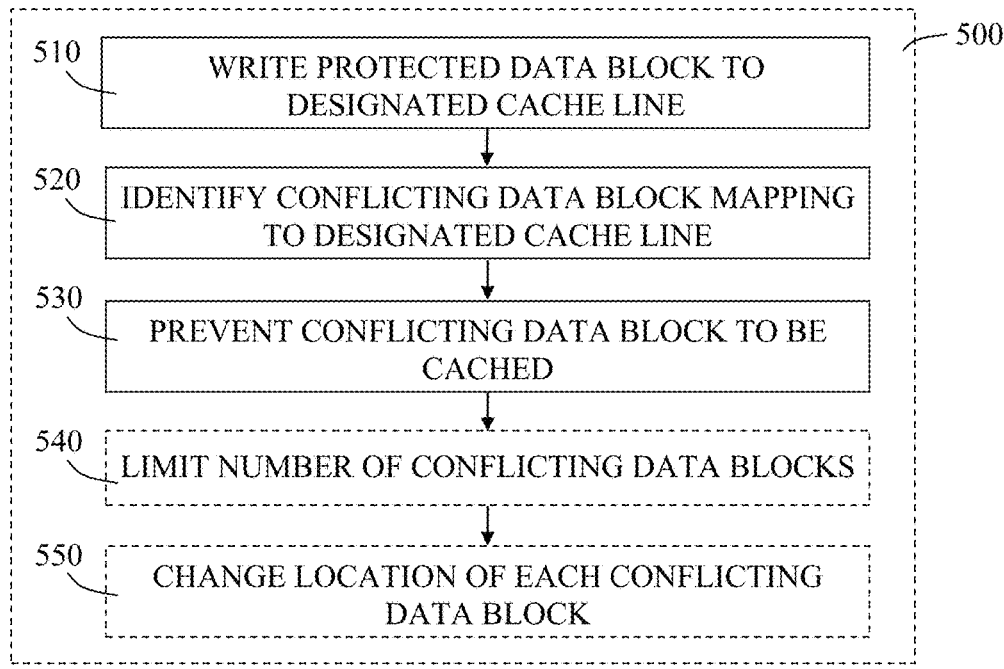
FIG. 5A is a flowchart representing selected actions of a method for preventing a protected data-block from being evicted from a CPU memory cache.

Reference is now made to the flowchart of FIG. 5A presenting selected actions of a method 500 for preventing a protected data-block from being evicted from a CPU memory cache. It is noted that this method may be used to change the state of a cache line from a non-protected state to a protected state for as long as a decrypted data block is stored therein.

The CPU memory cache (item 422, FIG. 4A) is a partial mirror-image of a portion of computer's main memory (item 440, FIG. 4A), comprises a plurality of cache-lines, where each cache-line comprises a plurality of data-blocks, of fixed size, tagged with the memory address of the data-block. The CPU memory cache is faster than main memory, thus requiring maximizing its utilization, in particular as the content of the memory cache is changing when new instructions or data are required. As appropriate, freeing space for new entries into the cache follows the current cache eviction policy, as described hereinafter.

Accordingly, running the protected code segment, requires placement into memory cache the decrypted instructions set, thus the set of data-blocks in memory cache needs to remain cached, disallowing eviction of the decrypted data-blocks. It is a particular feature of the current disclosure to change the state of the cache line storing the decrypted data-block from non-protected to protected state by identifying the conflicting data-blocks, which map to the protected memory cache-line, making them un-cacheable.

The method for preventing a protected data-block from being evicted from a CPU memory cache 500 may include the steps of: writing the protected data-block to a designated cache-line—step 510; identifying at least one conflicting data-block having a mapping indication to the designated cache-line—step 520; and preventing the at least one conflicting data-block from being cached—step 530.

The CPU may use the memory cache to store instructions that are repeatedly required to run programs, improving overall system speed with the average time to access memory reduced, thus crucial in terms of computer performance. The content of the memory cache is constantly changing upon computer program execution, requiring replacement functionality of data-blocks. Freeing space in the memory is performed according to the associated "replacement policy", also termed "eviction policy". The eviction policy dictates which data blocks currently in memory cache will be evicted by any new data block that gets fetched in. When the CPU needs to store a new block of data in the cache, it may need to determine the cache-line that corresponds to the memory address of the block, further check whether the cache-line is full, thereafter, may evict a data block according to its eviction policy to allow for placing a the new data-block in the freed space.

Eviction policy may use various methodologies, such as random replacement, First in First out (FIFO), Last in First out (LIFO) or a combination thereto.

Protected data blocks that are encrypted, such as may be associated with licensing check, may need to remain in cache whilst in a decrypted state so as to avoid being vulnerable to attack, copying, hacking or the like.

For example, given a data-block B, the set of all blocks of data that may conflict with B may be denoted by C(B), that is, C(B) is the set of data blocks that may potentially share a cache-line with B. In order to guarantee that data blocks are not altered even if the memory is modified, the current disclosure may store the data-blocks in the CPU.

In order to load data block $B_1, B_2, \ldots B_k$ to the memory cache it is sufficient to access those blocks of data. In order to make sure that these data-blocks will not be evicted by future accesses to other data-blocks, the current disclosure changes the cache lines in which protected data block are stored to a protected state, thereby making the regions of memory that contains the conflicting blocks of data $C(B_1)$, $C(B_2) \ldots C(B_k)$ non-cacheable.

Additionally or optionally, the method for preventing a protected data-block from being evicted from a CPU memory cache 500 may include the step of limiting the number of conflicting data-blocks—step 540. More specifically, it is aimed that for every 'i', each data-block Bi, may conflict with only a partial number "L" of data-blocks of the set $B_1, B_2, \ldots B_k$. The "L" parameter, may reach a maximum value of data-blocks in each memory line.

Additionally or optionally, the method for preventing a protected data-block from being evicted from a CPU memory cache 500 may further include the step of to changing the locations of the conflicting data-blocks, such that the conflicting data-blocks $C(B_1), C(B_2) \ldots C(B_k)$ become non-conflicting—step 550.

Figure 5B:
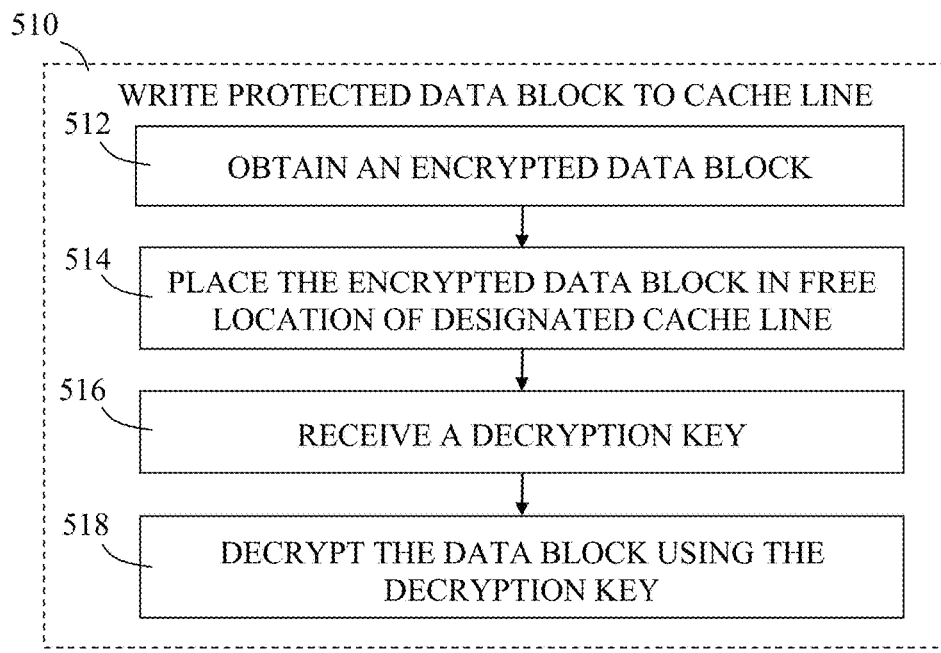
FIG. 5B is a flowchart representing selected actions of a method for writing a protected data-block into a CPU memory cache.

Reference is now made to the flowchart of FIG. 5B presenting selected actions of a method 510 for writing a protected data block into the CPU memory cache-line.

It may be noted that prior to writing the protected data-block, the execution instruction may further check whether the cache-line is full, and may evict a data block according to its eviction policy, as described hereinabove, to allow for placing the protected data-block in the freed space.

The method for writing a protected data-block to memory cache line 510 may include the steps of: obtaining an encrypted data-block—step 512; placing the encrypted data-block in a free location of designated memory cache line—step 514; receiving a decryption key, from the authority server (not shown)—step 516; and decrypting the encrypted data-block with the decryption key—step 518.

Figure 5C:
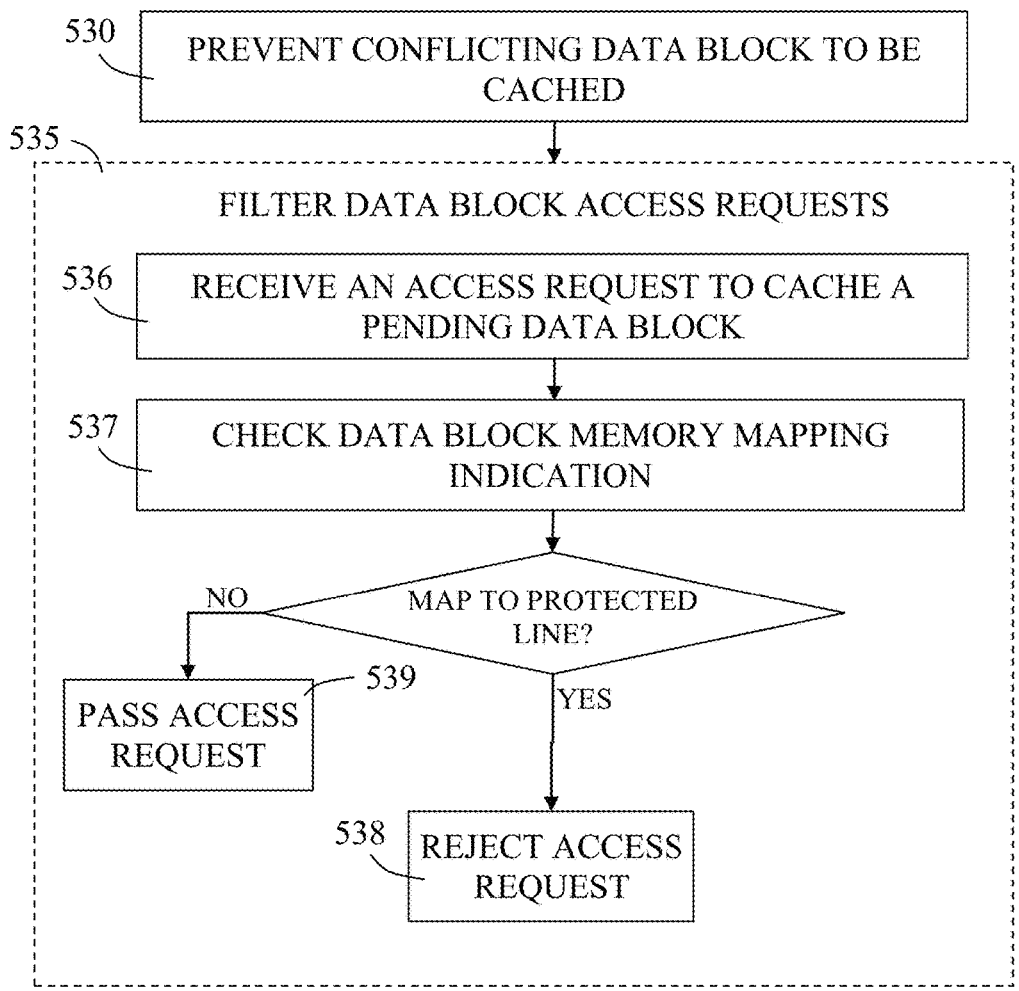
FIG. 5C is a flowchart representing selected actions of a method for preventing conflicting data-block from being cached.

Reference is now made to the flowchart of FIG. 5C presenting selected actions of a method for preventing conflicting data block to be cached 530.

A memory cache-line may contain a data field storing data from computer's memory and a tag field, storing the memory address of the data-block. The memory system may use cache mapping methods to quickly address memory references and determine if a given address is in the memory cache.

By way of example, there are three popular methods of mapping addresses to cache locations: Fully Associative Mapping, Direct Mapping, and Set Associative.

Wherein referenced Direct Mapping, main memory locations may only be copied into one location in the cache. This may be accomplished by dividing main memory into pages that correspond in size with the cache.

Wherein referenced Fully Associative Mapping, main memory locations may be placed anywhere in the memory cache, and if full, then a replacement algorithm may be used to determine which data-block in the cache gets evicted by the new data-block.

Wherein referenced Set Associative Mapping, blocks of main memory data may still map into as specific set as with Direct Mapping, but they may now be in any N-cache block frames within each set.

Additionally, it may be noted that the writing of a conflicting data block into the CPU memory cache-line is possible according to current "caching access policy" (known also as cache placement policy), unless overridden by an UN-CHACHEABLE flag associated with the data block to be written.

The caching access policy may be associated with cache updating with new data, or allocating a new data block in the cache if a specific write is a write miss (data block not in the cache).

By way of illustration, only, there may be two main caching access policies related to updating the cache with new data: (a) a Write-Through (WT) policy, and (b) a Write-Back (WB). The Write-Through (WT) policy "writes" that go to the cache are also "written through" to the next level in the memory hierarchy. The Write-Back (WB), "writes" go only to the cache, and are not (immediately) written through to the next level of the hierarchy.

Further, there may be two additional caching access policies related to allocating a new block in the cache, if a write misses: (a) a Write-Allocate (WA) policy, and (b) a Write-No-Allocate (NA). The Write-Allocate (WA) is typically used with the Write-Back (WB) policy. The Write-No-Allocate (NA) must be used in conjunction with Write-Through (WT).

Accordingly, as an example, the cache policy encoding, may use for a memory region configured as a cacheable memory, a memory attribute for encoding the policy. For example, a single bit flag may indicate whether a data block is in a NON-CACHEABLE state or CACHEABLE state, in still another example a two bit memory attribute may be used to indicate: [00] cache policy to be Non-Cacheable; [01] cache policy to be Write-Back, Write-Allocate; [10] cache policy to be Write-Through, No Write-Allocate; and [11] cache policy to be Write-Back, No Write-Allocate, accordingly, the [00] indication may be used to flag an NON-CACHEABLE state. Still other memory attribute coding protocols may be used as required.

The current disclosure allows for interacting with the memory system mapping methods to determine relevant memory cache locations, disallowing access requests which may cause eviction of protected data blocks.

The method for preventing conflicting data block to be cached 530 may further include a method for filtering data-blocks for access requests 535.

The method for filtering data-blocks for a access request 535 may include the steps of: receiving a access request to cache a pending data block—step 536; checking data-block memory mapping indication of pending data-block—step 537; and if the pending data block has a memory mapping indication matches to the designated cache-line, then rejecting access request—step 538, and otherwise passing the request to the cache so that the non-conflicting data block is stored—step 539.

Figure 6A:
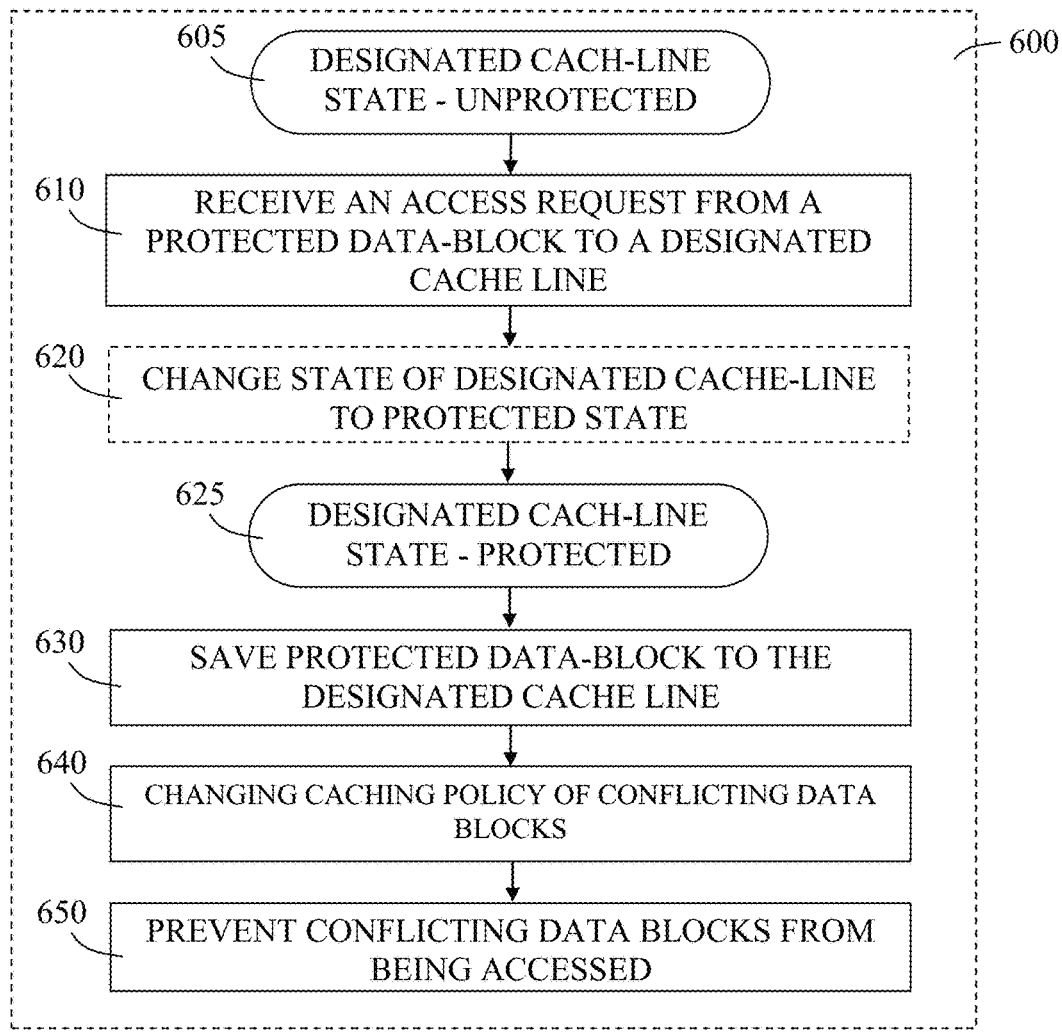
FIG. 6A is a flowchart representing selected actions of a method for protecting a line of a CPU memory cache from an access request that may expose protected data to a malicious activity.

Reference is now made to the flowchart of FIG. 6A presenting selected actions of a method for protecting a line of a CPU memory cache 600 from an access request that may expose protected data to a malicious activity. It is noted that this method may change the state of a cache line from a non-protected state to a protected state for as long as a decrypted data block is stored therein. Accordingly, the change of state may apply when the first protected data block is written into the memory cache.

The method for protecting a line of a CPU memory cache 600 may start with the designated cache line in a non-protected state 605, and may include the steps of: receiving an access request from a protected data block to the designated cache line—step 610; optionally, upon identifying of loading of a protected data block (encrypted code), the state of the designated cache line may change into a protected state—step 620 denoted in the flowchart as protected state 625; saving the protected data-block to the designated memory cache line, after decrypting the protected (encrypted) data-block—step 630, in a free location; changing caching access policy of conflicting data-blocks in the designated cache—step 640; and preventing conflicting data blocks from being accessed in the designated cache line—step 650.

Figure 6B:
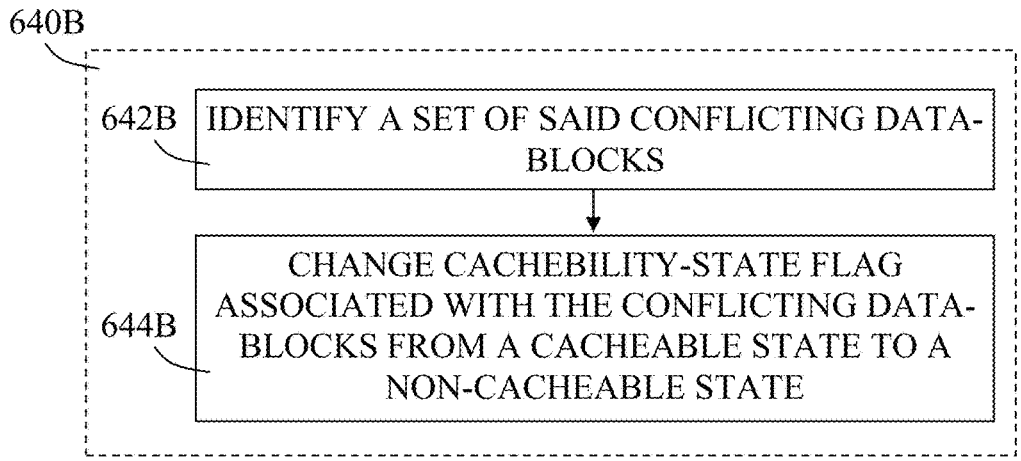
FIG. 6B is a flowchart representing selected actions of a method for changing caching access policy.

Reference is now made to the flowchart of FIG. 6B presenting selected actions of a method for changing caching access policy 640B.

The method for changing caching access policy 640B may include the steps of: identifying a set of conflicting data-blocks—step 642B; and changing the cacheability state flag associated with each data-block of the set of conflicting data-blocks from a cacheable state to a non-cacheable state—step 644C.

It may be noted that wherein referenced non-cacheable state, may be configured to use the existing current caching access policies, such as Write-back, Write-through and may further be coupled with write-allocate, where appropriate.

Figure 6C:
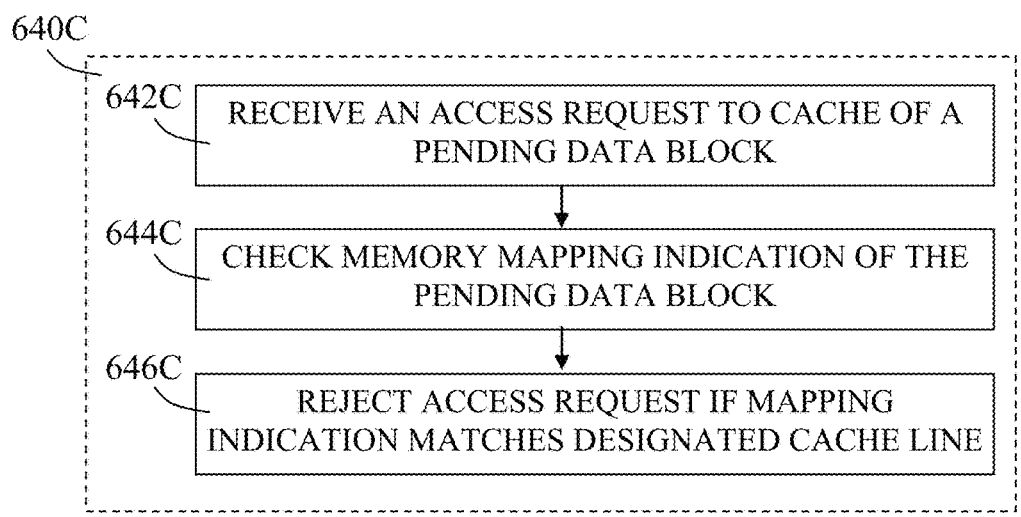
FIG. 6C is a flowchart representing selected actions of a method for filtering data-block access requests.

Reference is now made to the flowchart of FIG. 6C presenting selected actions of a method for filtering data-block access requests 640C.

The method for filtering data-block access requests 640C may include the steps of: receiving an access request for a pending data-block—step 642C; checking the memory mapping indication of the pending data-block—step 644C; and rejecting the access request, if the mapping indication of the pending data-block is of the designated cache line—step 646C.

Figure 7:
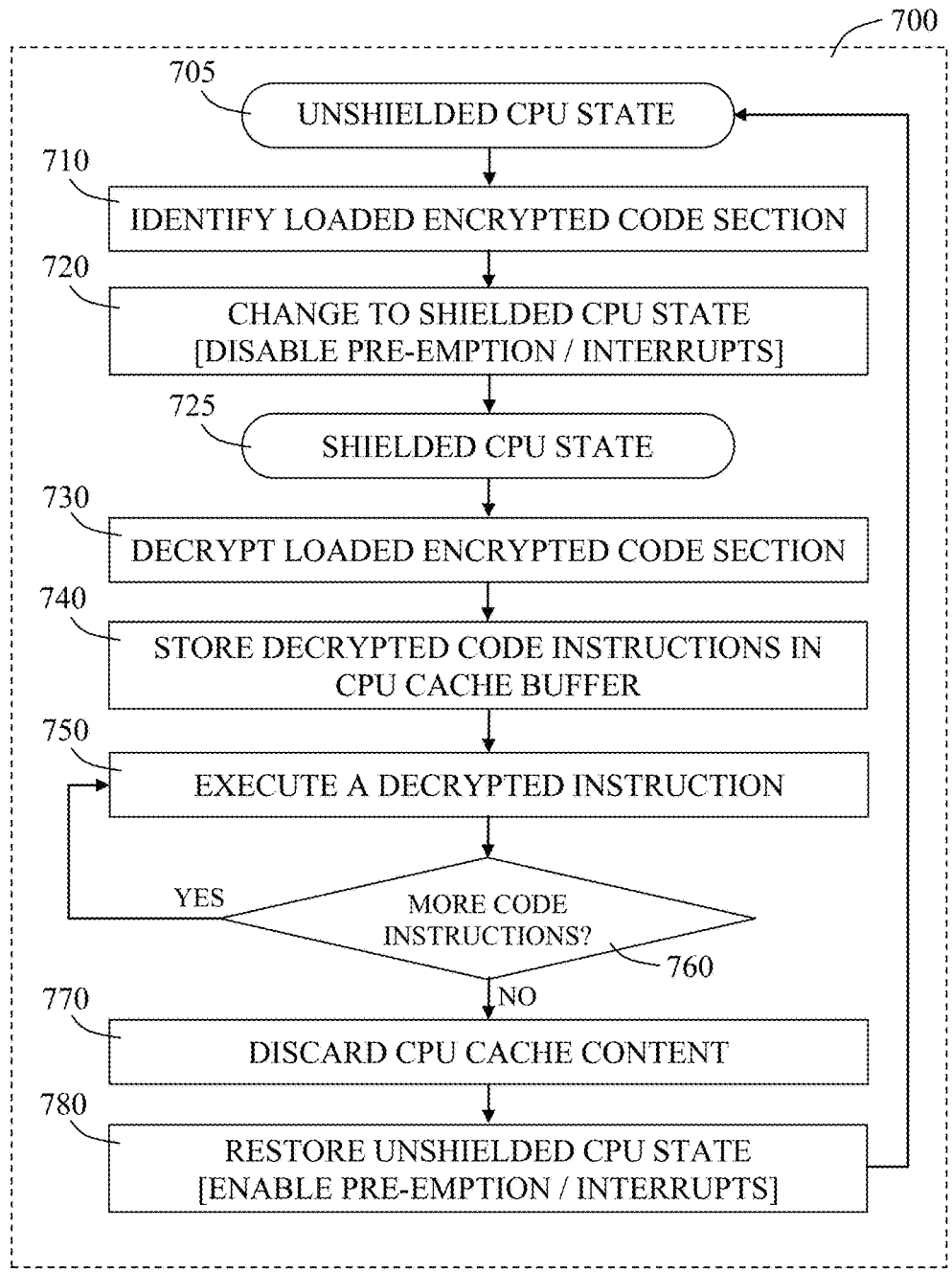
FIG. 7 is a flowchart representing selected actions of a method for buffered execution of encrypted code section.

Reference is now made to the flowchart of FIG. 7 presenting selected actions of a method for buffered execution of encrypted code section 700.

Modern computer architecture is CPU interrupt driven, where the interrupt mechanism may suspend the currently executing process to invoke a scheduler, determining the next process to be executed. Furthermore, preemption is the act of temporarily interrupting a task being carried out by a computer system without requiring cooperation of the interrupted task, which may be resumed at a later time, thus losing control over CPU cache content. Such a change may normally be carried out by a privileged task or part of the system known as a preemptive scheduler, which has the privilege to preempt, or interrupt.

It is noted, that the control of the current state of the CPU, and identification when an encrypted code section is loaded into the CPU cache is a specific feature of the current disclosure and may change CPU state, to a shielded state, for example to allow secured execution of critical code sections.

Moreover, the protocol stack execution of existing methods decrypts a single encrypted instruction at a time, so an instruction that is executed in a loop, may get decrypted on every iteration of the loop, making buffering a possible technique to eliminate the possible degradation of the computer system performance.

It is particularly noted that although the CPU may buffer these instructions in its cache in an executable state, the decrypted instructions are not stored to memory. The CPU may execute the decrypted instruction directly from cache, under the context of the kernel-mode driver, under a SHIELDED state of no-preemption and all-interrupts-disabled mode. It may subsequently delete the cache content just before normal UNSHIELDED state of CPU is resumed and control is returned to the system software.

It is noted that the buffer holding the decrypted code instructions may be a page in memory configured as a cacheable page, and as such any writing request reaches the cache, but is not written into the main memory.

This cycle of decrypt-execute-discard occurs for every instance of encrypted code execution, during the normal flow of the software. Which critical sections are encrypted in the instruction set may be selected carefully so as to minimize the performance hit, due to the decryption cycle, while still providing copy-protection.

The decryption key and decrypted machine-code segments may be locked in the CPU and may never be placed on the CPU BUS or stored to external memory. Therefore, malicious users may only have access to the code whose critical segments are encrypted. This property of the current disclosure may prevent the making of copies for unauthorized distribution or bypassing critical code sections such as license check.

It is noted that the decryption key may be obtained from the authority server (206, FIG. 2) each time a protected code section is being executed, if not available in a CPU register (426, FIG. 4A).

Optionally, the decryption key may be stored and locked in a CPU register (426, FIG. 4A) for as long as the protected code section is being executed and may further be discarded upon specific instruction.

The method for buffered execution of encrypted code segment 700 may start with normal UNSHIELDED CPU state 705, while performing regular computer processes and activities or executing computer software programs.

The method 700 may include the steps of: identifying a loaded encrypted code section—step 710, by the resident runtime module of current disclosure; therefore, the CPU state may be change to a different state, shielded state—step 720; resulting in a shielded state 725 where pre-emption and all interrupts are disabled; decrypting the loaded encrypted code section—step 730, possibly using the decryption obtained from the authority server (206, FIG. 2) and stored in the CPU registers (426, FIG. 4A); storing the decrypted code instructions in a CPU cache buffer—step 740; and further executing code instruction obtained from the buffer—step 750; this step is continuously repeated as long as there are more code instructions buffered for execution; if no additional code instructions are available in the buffer—step 760; then CPU cache content is cleared and discarded—step 770; restoring normal UNSHIELDED CPU state—780 by enabling pre-emption and all interrupts.

Remarks:

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A method for executing an encrypted code section in a CPU memory cache, said encrypted code section comprising a plurality of encrypted code instructions, the method comprising:
    writing said encrypted code section to said CPU memory cache;
    changing said CPU memory cache from an unshielded state in which preemption and CPU interruptions are enabled into a shielded state in which preemption and CPU interruptions are disabled;
    decrypting said encrypted code section;
    storing decrypted code instructions of said encrypted code section in said CPU memory cache; and
    executing said decrypted code instructions from a designated cache-line of said CPU memory cache.

2. The method of claim 1, further comprising deleting said decrypted code from said CPU memory cache following execution of said decrypted code.

3. The method of claim 2, further comprising restoring said CPU memory cache to the unshielded state following the deleting of the decrypted code.

4. The method of claim 1, wherein said unshielded state is characterized by at least one of preemption and CPU interrupt handler being enabled.

5. The method of claim 1, wherein said shielded state is characterized by at least one of preemption and CPU interrupt handler being disabled.

6. The method of claim 1, wherein said decrypting said encrypted code section further comprises obtaining an encryption key.

7. The method of claim 6, wherein said encryption key is stored in a CPU register.

8. The method of claim 6, wherein said encryption key is stored in a hypervisor environment.

9. A method for executing an encrypted code section in a CPU memory cache, said encrypted code section comprising a plurality of encrypted code instructions, the method comprising:
    writing said encrypted code section to said CPU memory cache;
    copying said encrypted code into a decryption module, said decryption module is loaded in a hypervisor environment;
    decrypting said encrypted code section using a decryption key, said decryption key is stored in said hypervisor environment;
    storing decrypted code instructions of said encrypted code section in said CPU memory cache;
    executing said decrypted code instructions from a designated cache-line of said CPU memory cache; and
    discarding said decrypted code instructions from said CPU memory cache.

10. A method for using a managed execution system in an improved manner to execute an encrypted managed program, said system comprising a managed execution environment, an extension module and a decryption module, said encrypted managed program comprising a plurality of executable blocks, each executable block comprising at least one instruction sequence, the method comprising:
    loading said encrypted managed program onto said managed execution environment;
    obtaining said at least one instruction sequence associated with said encrypted managed program;
    if said at least instruction sequence is not encrypted then executing said at least one instruction sequence; and
    if said at least one instruction sequence is encrypted then transferring, by said extension module, said encrypted instruction sequence to a decryption module; and
    executing, by said decryption module, said encrypted instruction sequence.

11. The method of claim 10, wherein said encrypted managed program is configured to overwrite original methods with an equivalent encrypted instruction sequence.

12. The method of claim 10, wherein said step of loading said managed encrypted program, comprises:
    invoking said extension module within said managed execution environment.

13. The method of claim 10, wherein said step of obtaining said at least one instruction sequence, comprises:
    analyzing said at least one instruction sequence; and
    communicating at least one execution event notification associated with said at least one instruction sequence to said extension module.

14. The method of claim 10, wherein said step of executing said encrypted instruction sequence, comprises:
    invoking said decryption module within an hypervisor environment;
    decrypting, by said decryption module, said encrypted instruction sequence into a decrypted instruction sequence;
    analyzing said decrypted instruction sequence to determine an execution-locator;
    if said execution-locator is local, then executing said decrypted instruction sequence; and
    if said execution-locator is external, then transmitting said decrypted instruction sequence to said extension module.

15. The method of claim 14, wherein said step of executing said decrypted instruction sequence, comprises:
    interpreting said decrypted instruction sequence.

16. The method of claim 14, wherein said step of decrypting said encrypted instruction sequence, comprises:
    obtaining a decryption key from an authority server; and
    decrypting said encrypted instruction sequence using said decryption key.

17. The method of claim 14, wherein said step of transmitting said decrypted instruction sequence, comprises:
    discarding all said decrypted instructions sequence except a current instruction;
    executing, by said extension module, said current instruction; and
    communicating, by said extension module, at least one result associated with the execution of said current instruction to said decryption module.

18. The method of claim 16, wherein said decryption key is protected by said hypervisor environment.

19. The method of claim 10, further comprising a context monitor operable to synchronize execution context status between said extension module and said decryption module.

20. The method of claim 10, wherein said at least one execution event notification is selected from a group of: a method entry indication, a specific instruction execution, a method invocation indication, a program loading indication, an occurrence of an exception condition and combinations thereof.

* * * * *